United States Patent [19]
Bohorquez et al.

[11] Patent Number: 6,003,984
[45] Date of Patent: Dec. 21, 1999

[54] INK-JET SWATH PRINTER WITH AUXILIARY INK RESERVOIR

[75] Inventors: Jaime H. Bohorquez, Escondido; Kenneth J. Courian, San Diego, both of Calif.; James E. Clark, Albany, Oreg.; Tofigh Khodapanah; George T. Kaplinsky, both of San Diego, Calif.; David W. Swanson, Escondido, Calif.; Mindy A. Hamlin; James G. Salter, both of San Diego, Calif.

[73] Assignee: Hewlett-Packard Co., Palo Alto, Calif.

[21] Appl. No.: 08/455,478

[22] Filed: May 31, 1995

Related U.S. Application Data

[63] Continuation-in-part of application No. 07/994,807, Dec. 22, 1992, Pat. No. 5,515,092, which is a continuation-in-part of application No. 07/853,372, Mar. 18, 1992, Pat. No. 5,464,578.

[51] Int. Cl.⁶ .................................................... B41J 2/175
[52] U.S. Cl. ............................................... 347/86; 347/85
[58] Field of Search ................................... 347/85, 86, 50, 347/84, 87

[56] References Cited

U.S. PATENT DOCUMENTS

| | | | |
|---|---|---|---|
| 3,930,258 | 12/1975 | Dick et al. ................................... | 346/75 |
| 4,223,323 | 9/1980 | Bader et al. ......................... | 346/140 R |
| 4,422,084 | 12/1983 | Saito .................................... | 346/140 R |
| 4,475,116 | 10/1984 | Sicking et al. ....................... | 346/140 R |
| 4,500,895 | 2/1985 | Buck et al. .......................... | 346/140 R |
| 4,714,937 | 12/1987 | Kaplinsky ............................ | 345/140 R |
| 4,831,389 | 5/1989 | Chan .................................... | 346/140 R |
| 4,833,491 | 5/1989 | Rezanka .............................. | 346/140 R |
| 4,929,963 | 5/1990 | Balazar ...................................... | 346/1.1 |
| 4,959,667 | 9/1990 | Kaplinsky ............................ | 345/140 R |
| 4,967,207 | 10/1990 | Ruder .................................. | 346/140 R |
| 4,968,998 | 11/1990 | Allen ................................... | 346/140 R |
| 4,970,528 | 11/1990 | Beaufort et al. .......................... | 346/25 |
| 5,121,132 | 6/1992 | Pan et al. ................................. | 346/1.1 |
| 5,136,305 | 8/1992 | Ims ............................................ | 346/1.1 |
| 5,280,300 | 1/1994 | Fong et al. ................................ | 346/1.1 |
| 5,309,179 | 5/1994 | Agbezuge et al. ....................... | 346/140 |

(List continued on next page.)

FOREIGN PATENT DOCUMENTS

| | | |
|---|---|---|
| 0 237 787 | 9/1987 | European Pat. Off. . |
| 0 322 131 | 6/1989 | European Pat. Off. . |
| 0 519 664 | 12/1992 | European Pat. Off. . |
| 0 623 444 | 11/1994 | European Pat. Off. . |
| 63-256451 | 10/1988 | Japan . |
| 2283459 | 5/1995 | United Kingdom . |

OTHER PUBLICATIONS

Patent Abstracts of Japan, vol. 010, No. 118 (M–475), May 2, 1986 & JP 60 248355 A (Canon KK), Dec. 9, 1985.

European Search Report dated Feb. 23, 1998 for European Patent Application 96303277.6–2304, Hewlett–Packard Company.

European Search Report dated Feb. 17, 1998, for European Patent application 96303276.8–2304, Hewlett–Packard Company.

*Primary Examiner*—Eddie C. Lee
*Assistant Examiner*—Michael Dalakis

[57] ABSTRACT

An ink-jet swath printer employing a cartridge with a spring bag primary reservoir and an auxiliary ink reservoir interconnected via a tube to form a closed ink replenishment system. The primary reservoir creates a negative pressure which draws ink from the auxiliary reservoir as ink is expelled from the cartridge printhead during printing operations. The auxiliary reservoir can either be mounted on the cartridge carriage or on the printer body. The auxiliary reservoir is a large capacity collapsible bag mounted below the level of the printhead to establish an ink pressure head at the primary reservoir connection which is not so large as to destroy or diminish the negative pressure and allow ink to drool from the printhead, yet is sufficient to permit replenishment of the primary reservoir to avoid printhead ink starvation.

44 Claims, 16 Drawing Sheets

U.S. PATENT DOCUMENTS

| | | | |
|---|---|---|---|
| 5,329,294 | 7/1994 | Ontawar et al. | 397/87 |
| 5,367,328 | 11/1994 | Erickson | 347/7 |
| 5,369,429 | 11/1994 | Erickson | 347/7 |
| 5,400,066 | 3/1995 | Matsumoto et al. | 347/84 |
| 5,400,573 | 3/1995 | Crystal et al. | 347/87 |
| 5,448,818 | 9/1995 | Scheffelin et al. | 347/86 |
| 5,491,502 | 2/1996 | Swanson et al. | 347/87 |
| 5,500,665 | 3/1996 | Ujita et al. | 347/87 |
| 5,610,644 | 3/1997 | Timm, Jr. et al. | 347/87 |
| 5,650,811 | 7/1997 | Seccombe et al. | 347/85 |

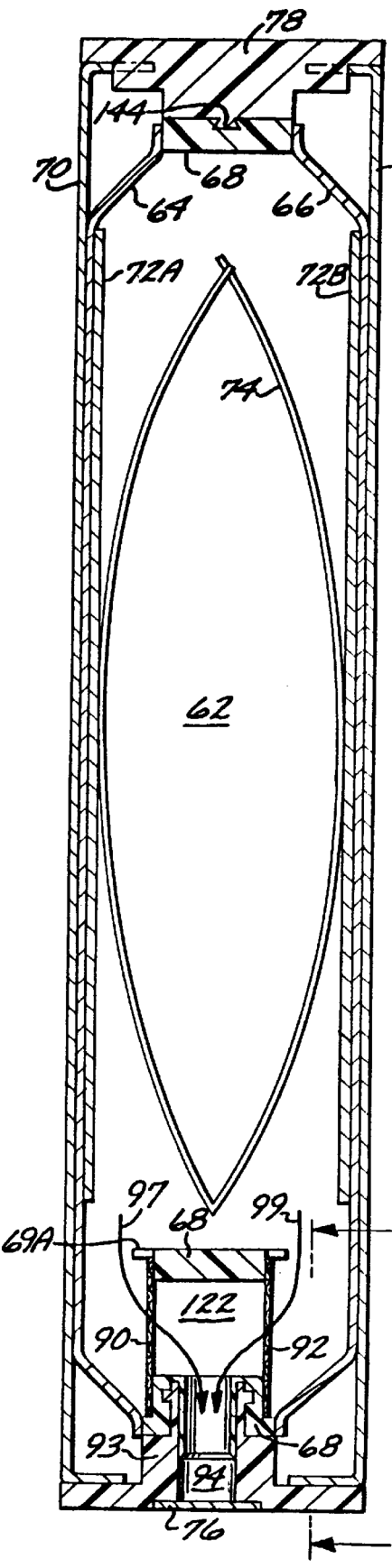
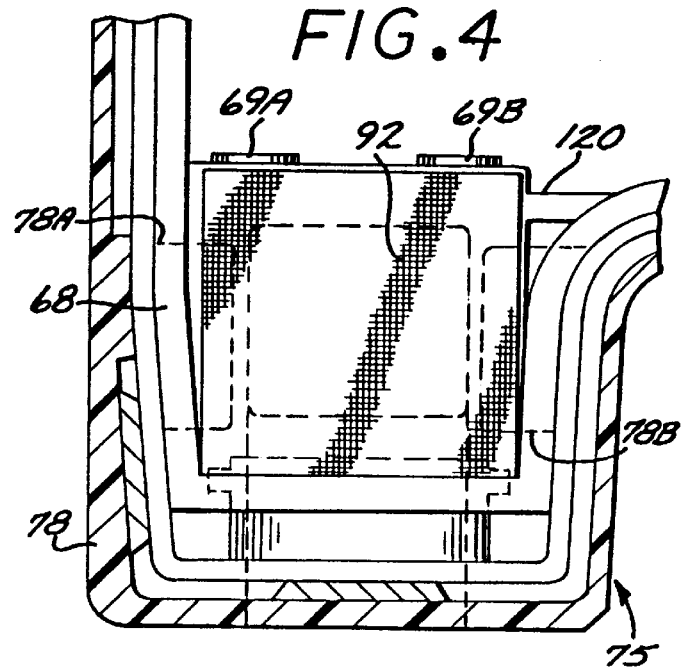
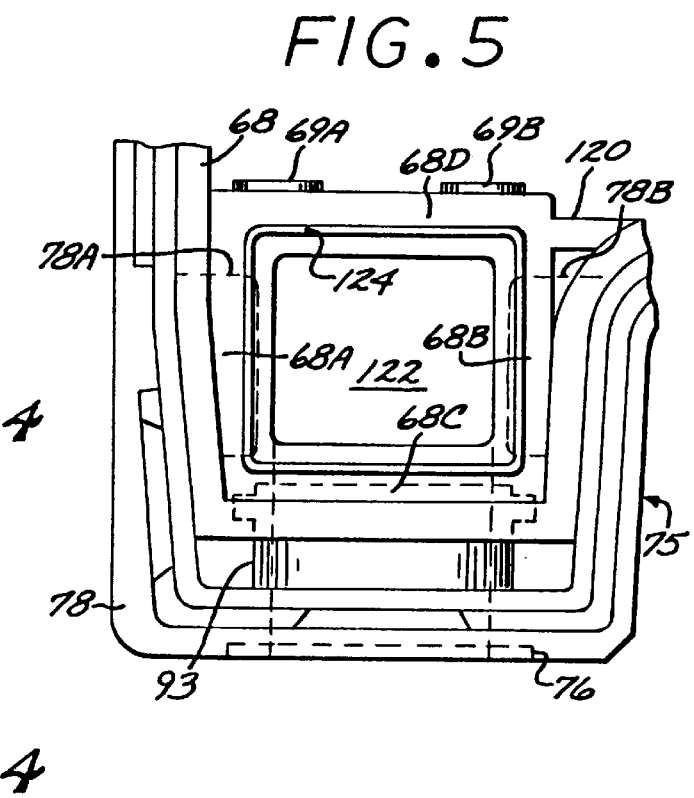
FIG. 3
FIG. 4
FIG. 5

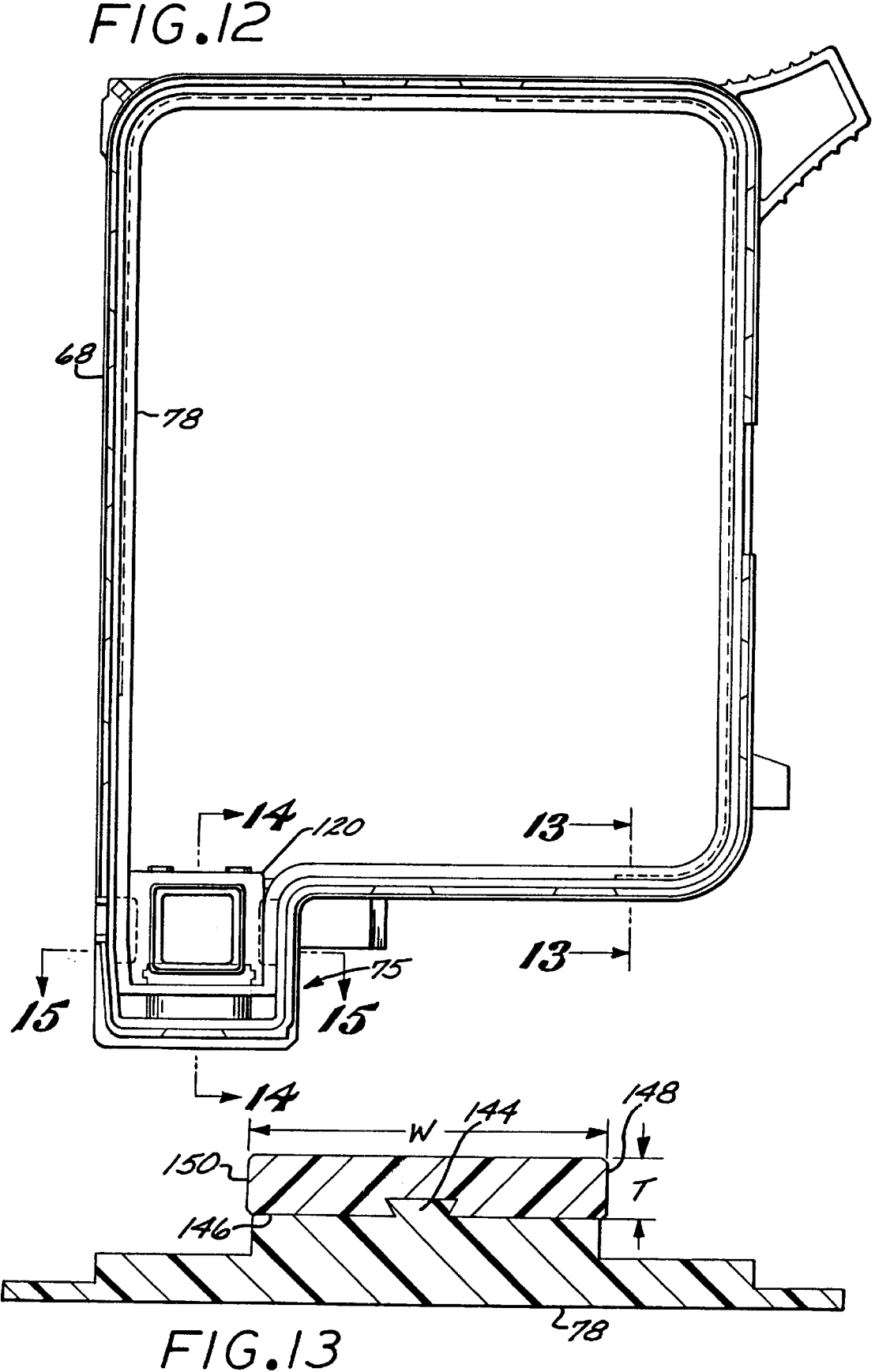

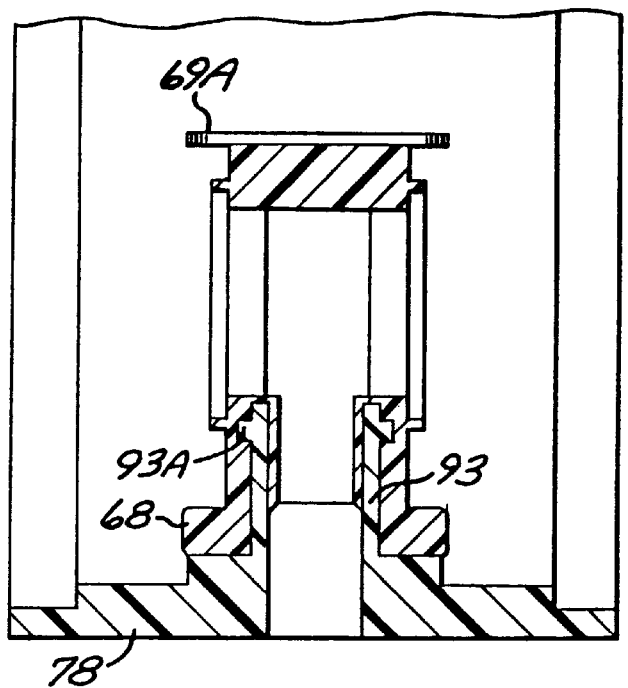
FIG.14
FIG.15
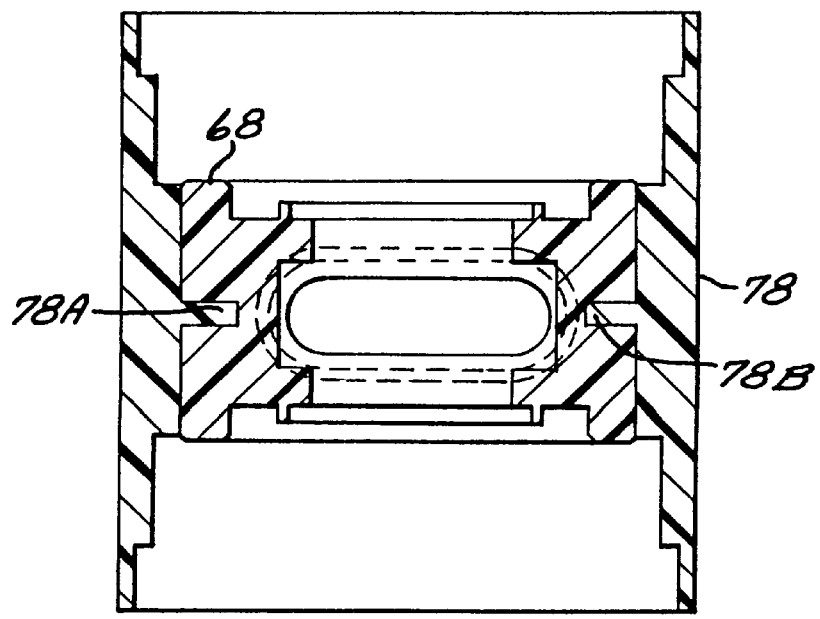

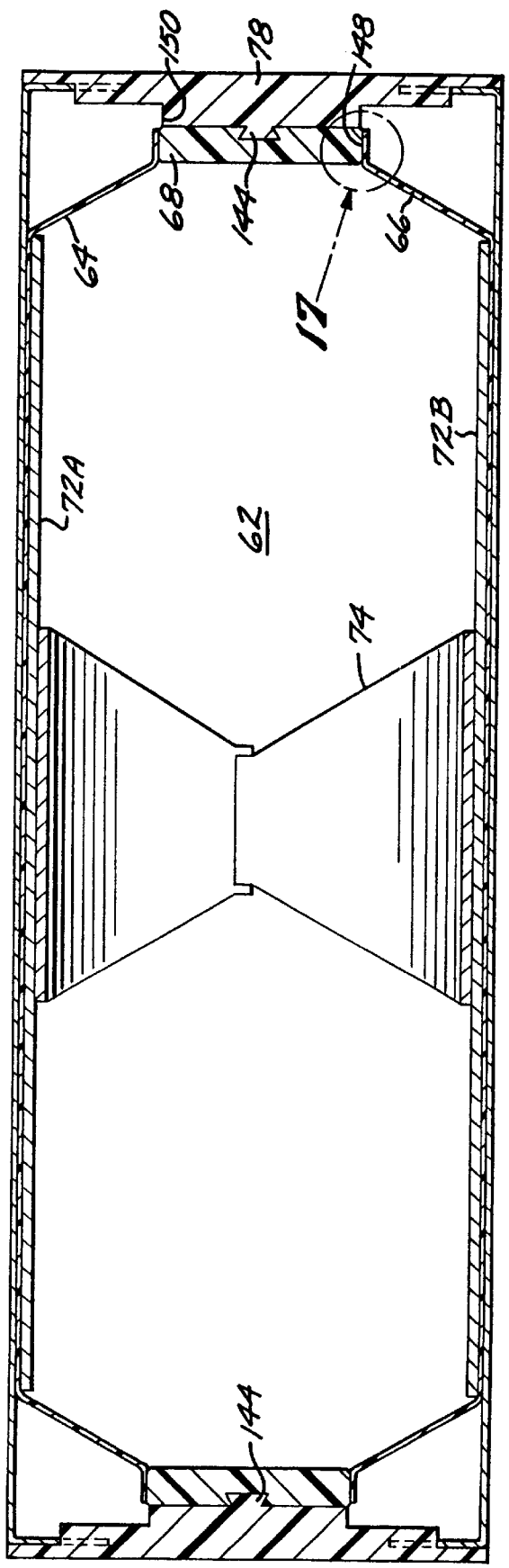
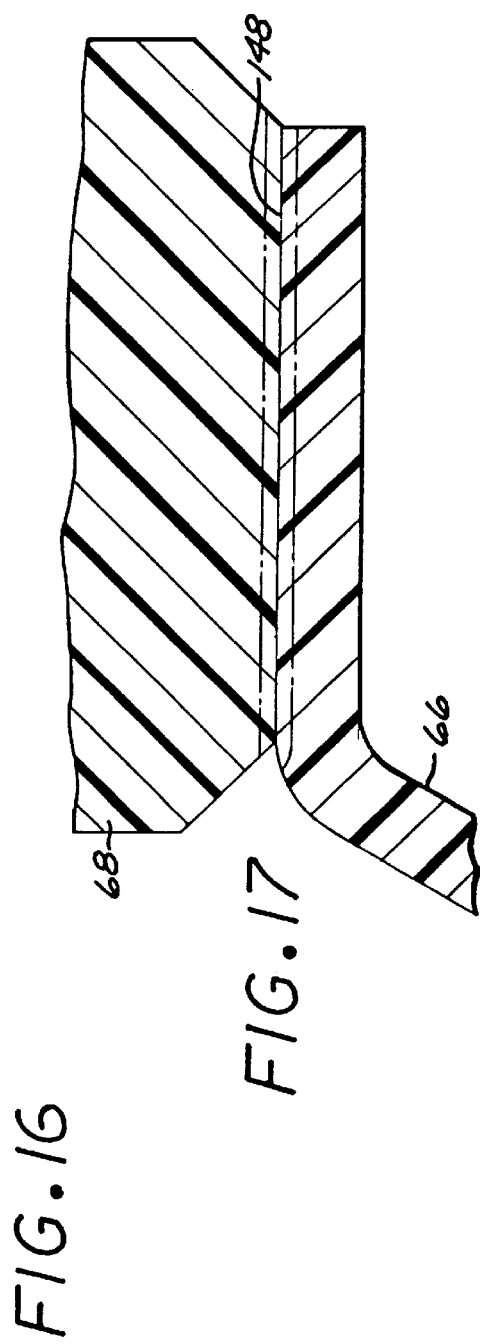
FIG. 16
FIG. 17

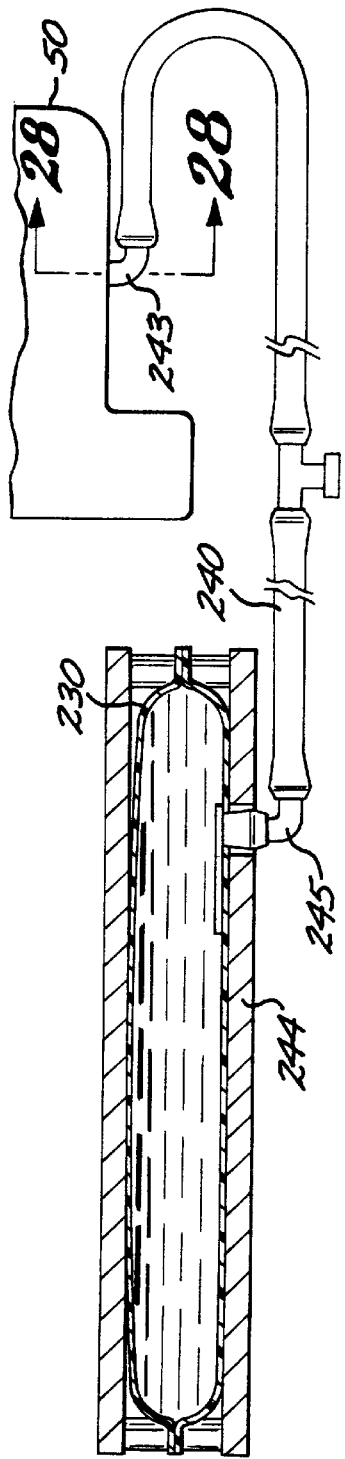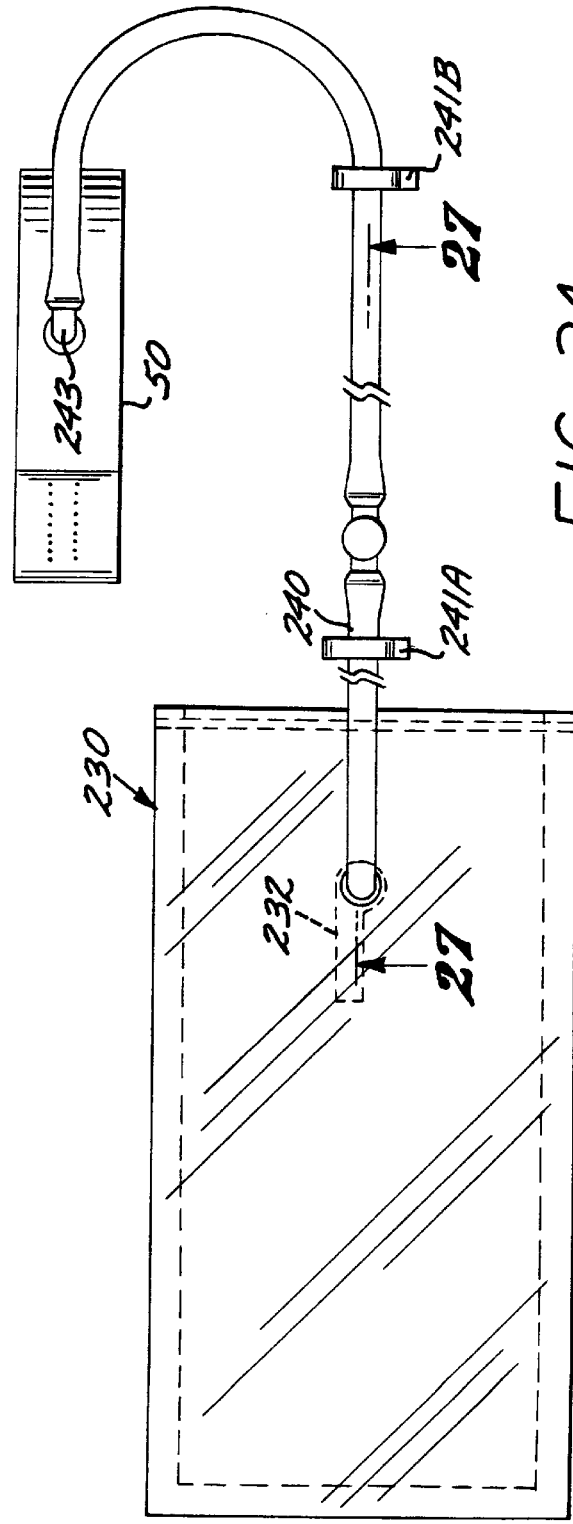

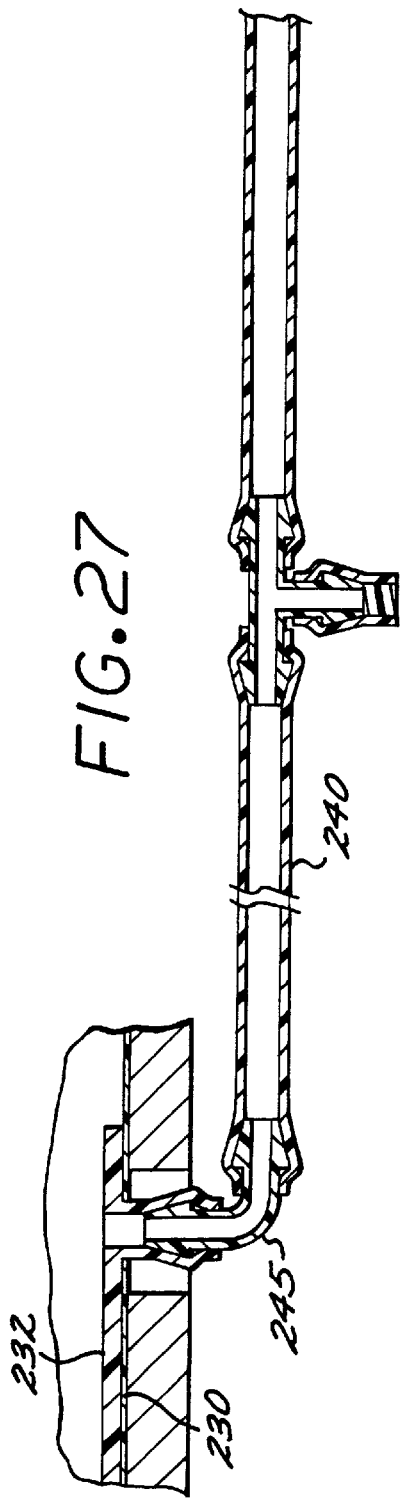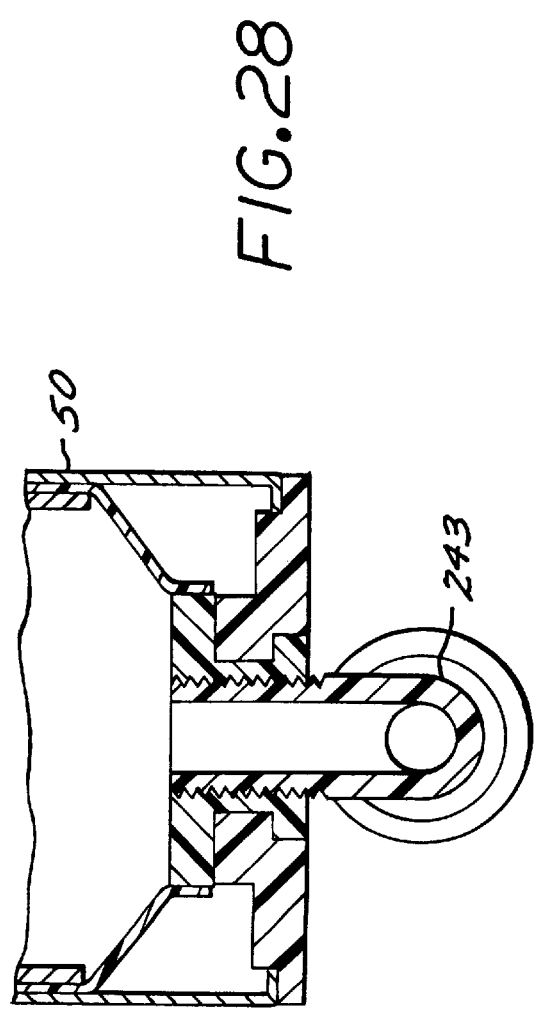

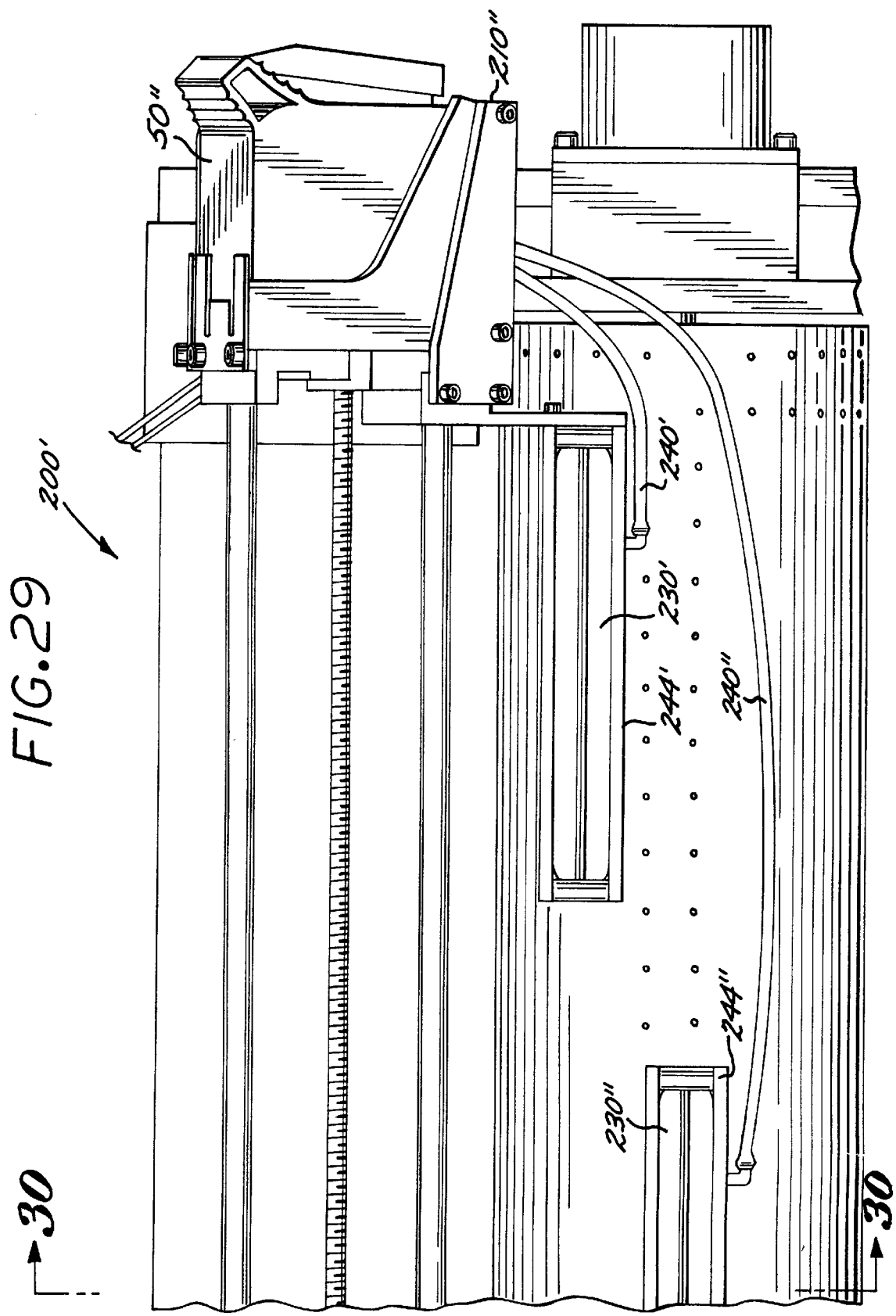

INK-JET SWATH PRINTER WITH AUXILIARY INK RESERVOIR

This is a continuation-in-part of commonly assigned application Ser. No. 07/994,807, filed Dec. 22, 1992 now U.S. Pat. No. 5,515,092, which in turn is a continuation-in-part of commonly assigned application Ser. No. 07/853,372, filed Mar. 18, 1992 now U.S. Pat. No. 5,464,578, entitled COMPACT FLUID COUPLER FOR THERMAL INKJET PRINT CARTRIDGE INK RESERVOIR by James G. Salter, et al., the entire contents of which are incorporated herein by this reference.

The present invention is related to the following commonly assigned U.S. patent applications: INK PRESSURE REGULATOR FOR A THERMAL INK-JET PRINTER, Ser. No. 07/928,811, filed Aug. 12, 1992, by Tofigh Khodapanah et al.; COLLAPSIBLE INK RESERVOIR STRUCTURE AND PRINTER INK CARTRIDGE, Ser. No. 07/929,615, filed Aug. 12, 1992, by George T. Kaplinsky et al.; COMBINED FILTER/AIR CHECK VALVE FOR THERMAL INK-JET PEN, by George T. Kaplinsky, Ser. No. 07/995,109, filed Dec. 22, 1992; DOUBLE COMPARTMENT INK-JET CARTRIDGE WITH OPTIMUM SNOUT, by David W. Swanson et al., Ser. No. 07/995,221, filed Dec. 22, 1992; THERMAL INK-JET PEN WITH A PLASTIC/METAL ATTACHMENT FOR THE COVER, by Dale D. Timm, Jr. et al., Ser. No. 07/994,810, filed Dec. 22, 1992; THIN PEN STRUCTURE FOR THERMAL INK-JET PRINTER, by David W. Swanson et al., Ser. No. 07/994,809, filed Dec. 22, 1992; RIGID LOOP CASE STRUCTURE FOR THERMAL INK-JET PEN, by David W. Swanson et al., Ser. No. 07/994,808, filed Dec. 22, 1992; SPRING-BAG PRINTER INK CARTRIDGE WITH VOLUME INDICATOR, by David S. Hunt et al., application Ser. No. 07/717,735, filed Jun. 19, 1991; NEGATIVE PRESSURE INK DELIVERY SYSTEM, by George T. Kaplinsky et al., Ser. No. 07/995,221, filed Dec. 22, 1992; and CONTINUOUS REFILL OF SPRING BAG RESERVOIR IN AN INK-JET SWATH PRINTER/PLOTTER, by Joseph E. Scheffelin et al., Ser. No. 08/454,975, filed concurrently herewith, attorney docket number 10950576-1; the entire disclosures of which are incorporated herein by this reference.

TECHNICAL FIELD OF THE INVENTION

This invention relates to ink reservoirs for thermal ink-jet ("TIJ") print cartridges.

BACKGROUND OF THE INVENTION

TIJ technology is widely used in computer printers. Very generally, a TIJ includes a print head typically comprising several tiny controllable ink-jets, which are selectively activated to release a jet or spray of ink from an ink reservoir onto the print media (such as paper) in order to create an image or portion of an image. TIJ printers are described, for example, in the Hewlett-Packard Journal, Volume 36, Number 5, May, 1985, and Volume 39, Number 4, August, 1988.

SUMMARY OF THE INVENTION

An ink-jet printer for ink-jet printing onto a print media is described, and includes an ink-jet cartridge including an ink-jet print head and a closed spring-bag primary reservoir in fluid communication with the print head for holding a first supply of liquid ink under negative pressure. The primary reservoir includes at least one movable side wall and an internal spring for biasing the movable side wall against collapsing as ink is withdrawn from the reservoir and ejected from the print head onto a print medium during printing operations. The printer includes means for effecting relative motion between the print medium and the print head during printing operations.

A closed auxiliary reservoir holds a second supply of liquid ink. A connection tube runs between the primary reservoir and the auxiliary reservoir for providing a closed fluid path to provide passive ink replenishment from the auxiliary reservoir to the primary reservoir during normal printing operation.

In accordance with another aspect of the invention, a method of replenishing liquid ink in a closed spring-bag primary reservoir in an ink-jet printing system is described. The method comprising the following steps:

providing an ink-jet cartridge including an ink-jet print head and a closed spring-bag primary reservoir in fluid communication with the print head for holding a first supply of liquid ink under negative pressure, the primary reservoir including at least one movable side wall and an internal spring for biasing the at least one movable side wall against collapsing as ink is withdrawn from the reservoir and ejected from the print head onto a print medium during printing operations;

providing a closed auxiliary reservoir for holding a second supply of liquid ink;

providing a closed ink path running between the primary reservoir and the auxiliary reservoir to provide passive ink replenishment from the auxiliary reservoir to the primary reservoir during normal printer operation.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 is a cross-sectional view of the pen of FIG. 1, taken lengthwise through the pen snout region.

FIG. 4 is a broken away cross-sectional view of the snout region of the pen of FIG. 1.

FIG. 5 is a view of the snout region of the pen of FIG. 1, taken prior to installation of the air check valve.

FIG. 12 is a side view of the external and inner plastic frame members comprising the pen cartridge of FIG. 1.

FIG. 13 is a cross-sectional view taken along line 13—13 of FIG. 12.

FIG. 14 is a cross-sectional view taken along line 14—14 of FIG. 12.

FIG. 15 is a cross-sectional view taken along line 15—15 of FIG. 12.

FIG. 16 is a cross-sectional view taken along line 16—16 of FIG. 6.

FIG. 17 is an enlarged view of the region within circle 17 of FIG. 16.

FIG. 23 illustrates in isolation the fluid connection between the spring bag cartridge primary reservoir and the auxiliary reservoir.

FIG. 24 is a bottom view of the spring bag cartridge and the auxiliary reservoir of FIG. 23.

FIG. 27 is a cross-sectional view of the closed fluid path between the auxiliary reservoir and the cartridge, taken along line 27—27 of FIG. 24.

FIG. 28 is a cross-sectional view taken along line 28—28 of FIG. 23, showing the tube connection to the cartridge fill port.

FIG. 29 is a partial front view of an alternate embodiment of a swath printer employing a plurality of spring bag cartridges and auxiliary reservoirs in accordance with the invention.

DETAILED DESCRIPTION OF THE PREFERRED EMBODIMENT

Figure 1:
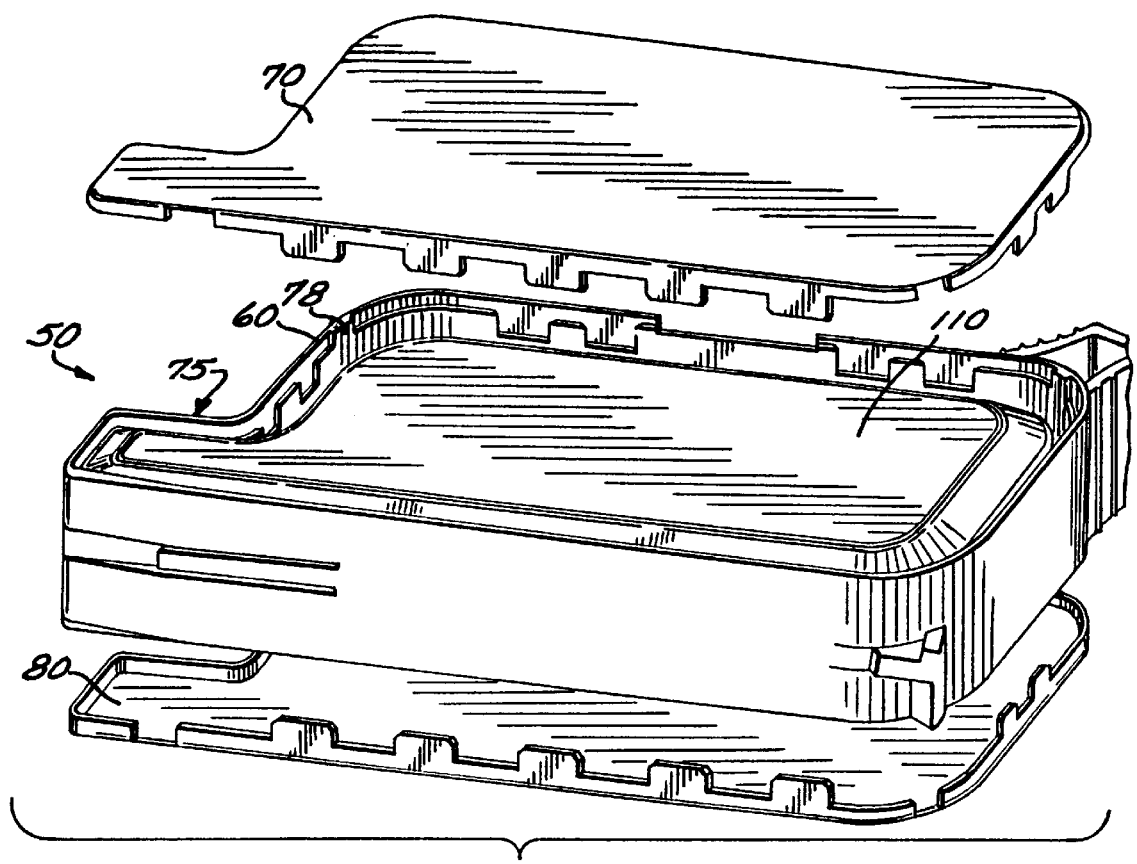
FIG. 1 is an isometric view of a thermal ink-jet pen cartridge embodying the invention, shown with its covers in an exploded form.
Figure 2:
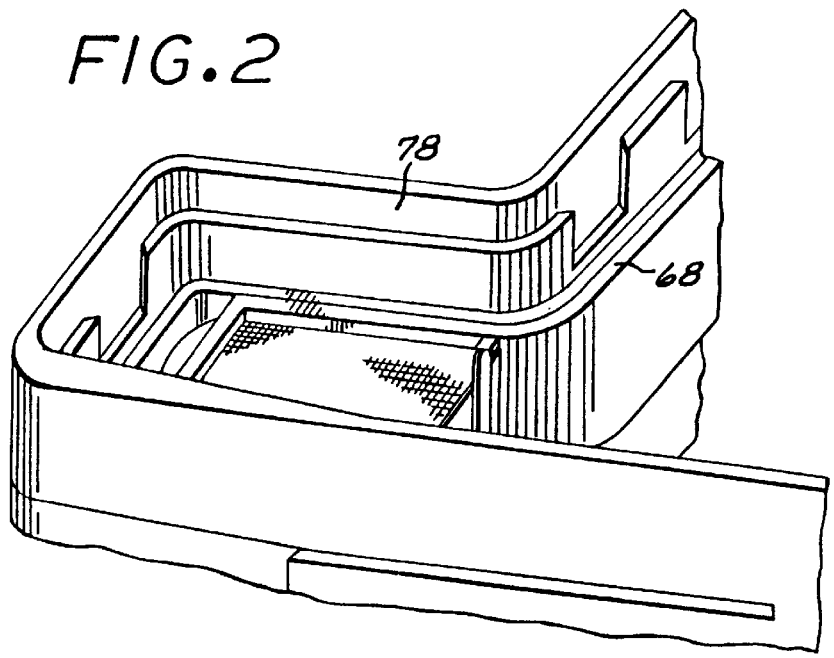
FIG. 2 is an enlarged view of the snout region of the pen of FIG. 1.

FIGS. 1–17 illustrate a thermal ink-jet pen cartridge 50 embodying the present invention. The pen 50 comprises an external frame structure 60 which defines a closed band or loop defining the periphery of the pen 50. The pen structure 60 comprises two chemically dissimilar plastic members 78 and 68. The external plastic member 78 is molded from a relatively rigid engineering plastic such as a glass-filled modified polyphenylene oxide, such as the material marketed under the trademark "NORYL" by General Electric Company. An inner plastic member 68 is injection molded to the inner periphery of the external plastic member 78, and is fabricated of a plastic material suitable for attaching the ink reservoir membranes 64 and 66. A plastic suitable for the inner plastic member 68 is a polyolefin alloy or 10 percent glass-filled polyethylene.

The frame 60 defines a generally rectilinear open volume region 110 and a snout region 75 protruding from one corner of region 110. The external plastic member 78 is molded to form a standpipe 93 with an interior opening or channel 94 formed therein. The standpipe channel 94 communicates with a TIJ printhead 76 secured across the external end of the snout opening 94. Ink flows through the standpipe channel 94 to supply the printhead 76 with ink. As drops of ink are forced outwardly through the printhead nozzles, ink flows through the standpipe 94 from the reservoir 62 via the fluid paths indicated generally by arrows 97 and 99 to replenish the ink supply available to the printhead 76.

The inner plastic member 68 further includes a support rib 120 which extends across the throat of the snout region 75, separating the snout region from the main ink reservoir area 62. A generally rectangular chamber area 122 is formed by a surrounding structure of the inner member 68 extending between the rib 120 and the inner opening of the standpipe channel 94.

First and second membranes 64 and 66 are attached to the inner plastic member 68 through heat staking, adhesives or other bonding processes, to form a leak-proof seal between the inner plastic member 68 and the membranes. The membranes 64 and 66 are formed of a material which is impermeable to the ink to be stored within the ink reservoir, and compatible with the plastic of material from which the inner plastic member 68 is fabricated. A preferred material for the membranes 64 and 66 is ethylenevinyl acetate (EVA). The ink delivery system includes a spring 74 which applies a separating force against two opposed piston plates 72A and 72B inside the ink reservoir to separate the membranes 64 and 66. The spring and piston elements maintain negative pressure on the ink in the reservoir to keep the ink from drooling from the printhead 76. As ink is consumed from the reservoir, atmospheric pressure on the membranes 64 and 66 result in compression of the spring with the plates 72A and 72B drawn toward each other.

The membranes 64 and 66 extend over the standpipe region, and in this embodiment are heat staked along the edge regions 68A, 68B and 68C (FIG. 4) to maintain the sealing of the membranes along the periphery of the snout region 75. The membranes 64 and 66 are not sealed to the region of the rib 120. Standoffs 69A and 69B comprising the inner plastic member 68 hold the membranes off the area of rib 120, to ensure the membranes do not sag against the support rib structure and thereby close off the ink flow from the ink reservoir to the standpipe 93.

An air check valve is provided in the fluid path between the printhead 76 and the ink reservoir 62, to prevent air bubbles from travelling from the printhead into the reservoir 62. The valve also serves the function of a filter to prevent particulate contaminates from flowing from the ink reservoir 62 to the printhead 76 and clogging the printhead nozzles. In this embodiment, the valve includes two valve members 90, 92 one on each side of the frame. The valve members 90 and 92 each comprise, in this exemplary embodiment, a section of finely woven stainless steel mesh, the edges of which are attached to the inner plastic member. The mesh has a nominal passage dimension of 15 microns between adjacent mesh strands, and has a typical thickness of less than 0.005 inches. In this embodiment, each mesh member 90 and 92 is square, and covers an area of about one centimeter by one centimeter. A mesh marketed under the tradename RIGIMESH-J by Engle Tool and Die, Eugene, Oreg., is suitable for performing the function of the check valve. The mesh passage size is sufficiently small that, while ink may pass through the passages of the mesh, air bubbles under normal atmospheric pressure will not pass through the mesh passages which are wetted by the ink. The required air bubble pressure necessary to permit bubbles to pass through the mesh, in this embodiment, about 30 inches of water, is well above that experienced by the pen under any typical storage, handling or operational conditions. As a result, the mesh serves the function of an air check valve for the pen.

A second function fulfilled by the mesh valve is that of a particulate filter, preventing particles as small as 15 microns from passing through the mesh. It is known to use a mesh of this mesh opening size in a particulate filter in vented, foam-filled ink reservoirs. Such reservoirs have no need for an air check valve.

There is a pressure drop across the mesh members 90 and 92. If the mesh opening size is too small, not enough ink will flow through the mesh, and the printhead will starve. Two separate mesh members 90 and 92 are employed to ensure sufficient ink flow from the reservoir 92 into the chamber 94.

FIGS. 4 and 5 illustrate the snout region 75 of the pen 50. FIG. 4 is a cross-section taken along line 4—4 of FIG. 3. FIG. 5 is a view of the snout without the covers and valve element 90 and 92 in place. The frame member 78 includes a pair of inwardly facing tabs 78A and 78B which provide support to the portion of inner frame member 68 molded around the inner periphery of the snout region 75. The tabs 78A and 78B also serve as coring features for molding of the inner member 68. The frame member 68 defines inner chamber 122, with a rectilinear frame portion extending around the periphery of the chamber. The frame portion is defined by side regions 68A–D. As shown in FIG. 3, the width of member 68 defines the width of the chamber 122. The side regions 68A–D thus define a window into the chamber 122 on each cover-facing side of the member 68. Each side of the chamber 122 which extends in a perpendicular sense to the plane of the covers 70 and 80 is defined by the plastic comprising member 68.

During operation, air bubbles may accumulate in the chamber 122. The printer in which the pen 50 is installed may include a priming station to apply a vacuum to the printhead to withdraw the air bubbles through the printhead, and draw ink from the reservoir to fill the standpipe opening and the chamber 122. Such priming stations are known in the art.

The frame member 68 is molded to define a thin lip 124 which protrudes from the side regions 68A–D and extends around the periphery of the frame portion. Such a lip is defined on each cover-facing side of the member 68; only lip 124 is visible in FIG. 5. During the heat staking operation used to attach the mesh screen members the heated die member is positioned over the mesh member, and brought downwardly against the mesh member with force. The temperature of the die member is sufficient to soften or melt the plastic material defining the lip 124, so that some of the molten plastic flows into the adjacent interstices of the mesh. Upon removal of the die member and cooling of the plastic, the mesh member is firmly attached to the member 68 all around the periphery of the window into the chamber 122.

Figure 6:
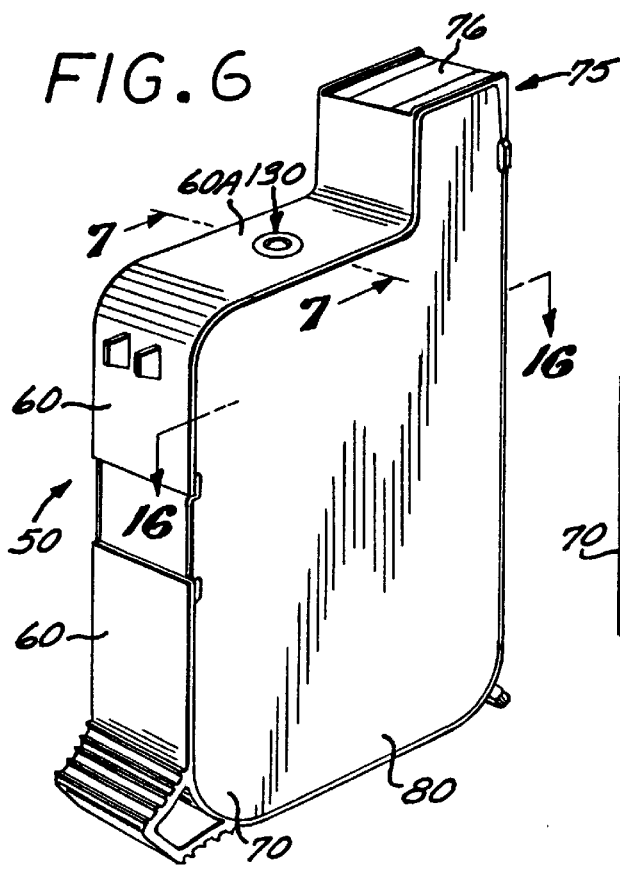
FIG. 6 is an isometric view of the thermal ink-jet pen cartridge of FIG. 1.
Figure 7:
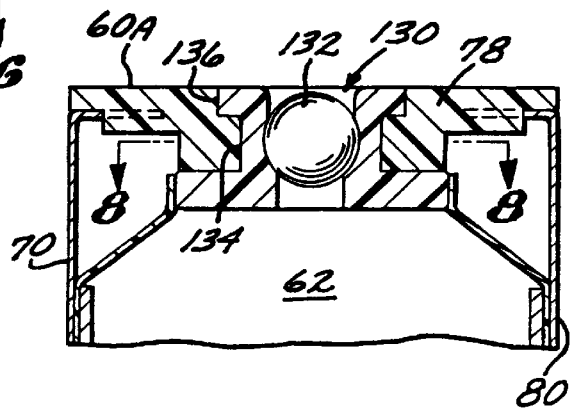
FIG. 7 is a cross-sectional view taken along line 7—7 of FIG. 6.
Figure 8:
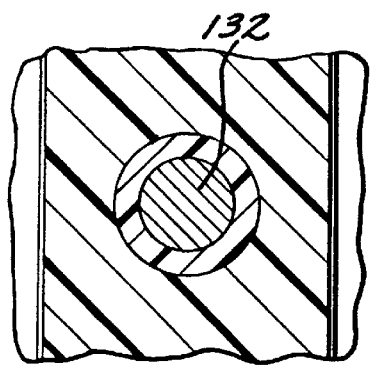
FIG. 8 is a cross-sectional view taken along line 8—8 of FIG. 7.

FIGS. 6–9 illustrate the location and structure of the ink fill port 130 of pen 50. As shown in FIG. 6, in this embodiment, the fill port 130 is located in a flat surface 60A of the frame 60 adjacent the pen snout region 75. The ink reservoir 62 is filled with ink via the port 130, which is thereafter sealed off by insertion of a stainless steel ball 132.

The external frame member 78 is molded to form an opening of circular cross-section, whose diameter transitions abruptly from a smaller diameter in the region 134 in which the ball 132 is captured, to a larger diameter in the region 136 adjacent the surface 60A. In this embodiment, the ball 132 has a diameter of 0.187 inches (4.76 mm), the smaller diameter of the frame member 78 in the region 134 is 0.236 inches (6.0 mm), and the larger diameter of the frame 78 in the region 136 is 0.283 inches (7.2 mm).

During the molding of the inner plastic member 68 onto the previously fabricated outer frame member 78, the molten plastic flows through the opening formed for the ink fill port in the member 78 and around a mold pin inserted therein to form the fill port structure comprising the inner member 68. Thus, the molten plastic flows around the material forming the member 78 at region 134, providing a lining thereover. Moreover, the inner member 68 thus formed defines the fill port opening 130 which communicates with the ink reservoir 62. The diameter of the fill port opening 130 tapers from a first diameter of the opening adjacent the surface to a second, smaller diameter at 138 adjacent the reservoir 62 which is substantially smaller than the diameter of the ball 132. In this exemplary embodiment, the first diameter is 0.179 inches and the second diameter is 0.120 inches.

To fill the reservoir 62, the pen is held with the snout region 75 in an upright position as shown in FIG. 6. A needle is lowered through the fill port opening 130 down into the ink reservoir nearly touching the bottom of the reservoir. This is done so that the ink falls the shortest distance possible, as some inks will foam if they fall, which makes priming difficult later. The pen reservoir is then filled with ink through the ink fill needle by a pumping means to the point that the ink in the reservoir is nearly touching the inside of the ink fill hole. At this point the needle is drawn out of the pen and a ball 132 is placed over the ink fill opening 130. The ball fits tightly within the opening 138, as it must displace some of the plastic material surrounding the opening 130, due to its size relative to the opening size. The ball 130 is then pressed into the ink fill 130B by a pressing tool 140 (FIG. 9) such that it just touches the inner diameter at 138 at the bottom of the ink fill opening 130. At this point the ink is contained in the pen reservoir; however, an air path exists from the top of the free surface of the ink through the printhead nozzles which must be removed to establish the initial pen back pressure.

The air is pulled from the pen with the pen 50 tilted on a 30 degree angle such that the highest point is the snout region 75. This is done because the air will float to the highest point which then is the snout region, and thereby facilitating pulling the air from the pen by the primer. A suction head is then placed over the nozzle region of the thermal ink-jet head and vacuum pulled. As the vacuum removes air from the pen and the ink level will rise, wet out the filter, and eventually make its way up to and through the printhead nozzles. This process has been characterized such that a known amount of ink will be pulled through the nozzles to establish the initial back pressure in the pen at −1 inch of water. After the pen is primed, the top surface of the printhead is washed with clean water and an air knife to remove any excess ink from the priming process. After the pen has been primed it, of course, may be turned in any orientation with the ink remaining in the pen.

Figure 10:
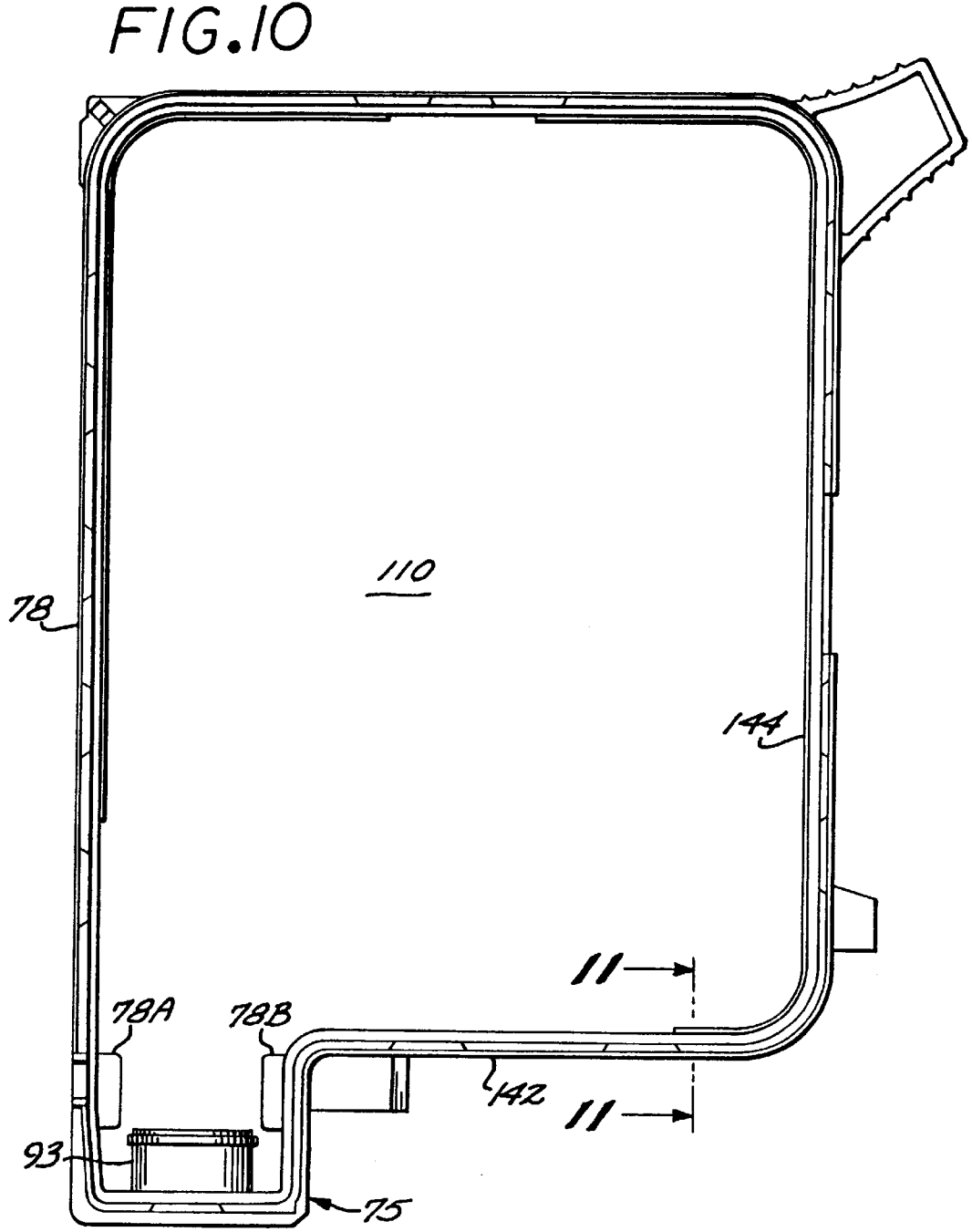
FIG. 10 is a side view of the external plastic frame member comprising the pen cartridge of FIG. 1.
Figure 11:
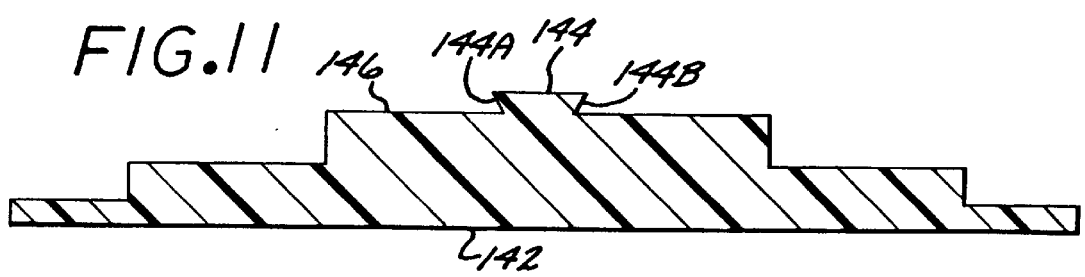
FIG. 11 is a cross-sectional view taken along line 11—11 of FIG. 10.

FIGS. 10 and 11 show in isolation the outer plastic member 78 comprising the pen 50. In particular, it can be seen in FIG. 11 that the plastic member 78 presents an exterior flat surface 142, but that the inner side of member 78 presents several steps to increase the thickness of member 78, forming a plateau 146. A rib feature 144 is formed along the center of the member 78 extending from plateau 146, and includes undercut sides 144A and 144B. The rib 144 extends along part or nearly all of the sides of the frame member 78, as shown in FIG. 10.

FIG. 12 is a side elevation view corresponding to FIG. 10, but showing the inner frame member 78 molded onto the outer frame member 78. The frame member 78 extends along the plateau 146, and covers the rib 144. The undercut sides of the rib provide a locking means for locking the member 68 onto the member 68. In this embodiment, the member 68 has a thickness T (0.059 inches) and a width W (0.354 inches) in the area shown in FIG. 13. The sides 148 and 150 of the member 68 which extend generally perpendicular to the frame member 78 provide surfaces to which the ink reservoir membranes 64 and 66 may be attached.

The material forming the inner member 68 has a shrink rate as it cools from the molten state. This material is molded inside the outer frame 78 and tends to shrink away from the frame 78 as it cools. To keep the inner plastic member 68 attached to the exterior frame member 78, it is molded onto the undercut features 144 which are molded as part of the member 78. As the material forming member 68 cools, it locks onto the external frame 78 by these features 144, thereby countering the forces of the material forming member 68 to pull away from the external frame 78 due to the shrinkage of that material. The locking rib 144 shown has a simple cross section which is easy to mold.

A soft polyolefin alloy can be used as the material for member 68, as it adheres chemically to the surface of the NORYL material and has a shrink rate that is very low (about equal to the NORYL 2.5 mills/inch) so that the forces created during the shrinking process are lower than, for example, pure polyethylene which is about 20 mils/inch. An exemplary material suitable for construction of member 68 is described in application Ser. No. 08/058,730, filed May 3, 1993, entitled "Two Material Frame Having Dissimilar Properties For Thermal Ink-Jet Cartridge."

FIGS. 14 and 15 show the structure of the members 68 and 78 in the snout region in further detail. The material of the inner member 68 flows over the ribs 78A and 78B, and covers the standpipe 93, locking onto the rib 93A.

FIG. 16 is a cross-section taken along line 16—16 of FIG. 6. Elements defining the ink reservoir are visible here. Attachment of the spring bag membranes 64 and 66 to the opposed side surfaces 148 and 150 of the inner member 68 is illustrated. FIG. 17 in particular is an enlarged view illustrating the heat staked attachment of the membrane 66 to surface 148 of the inner frame member 68. Heat staking per se is well known in the plastics art.

Figure 18:
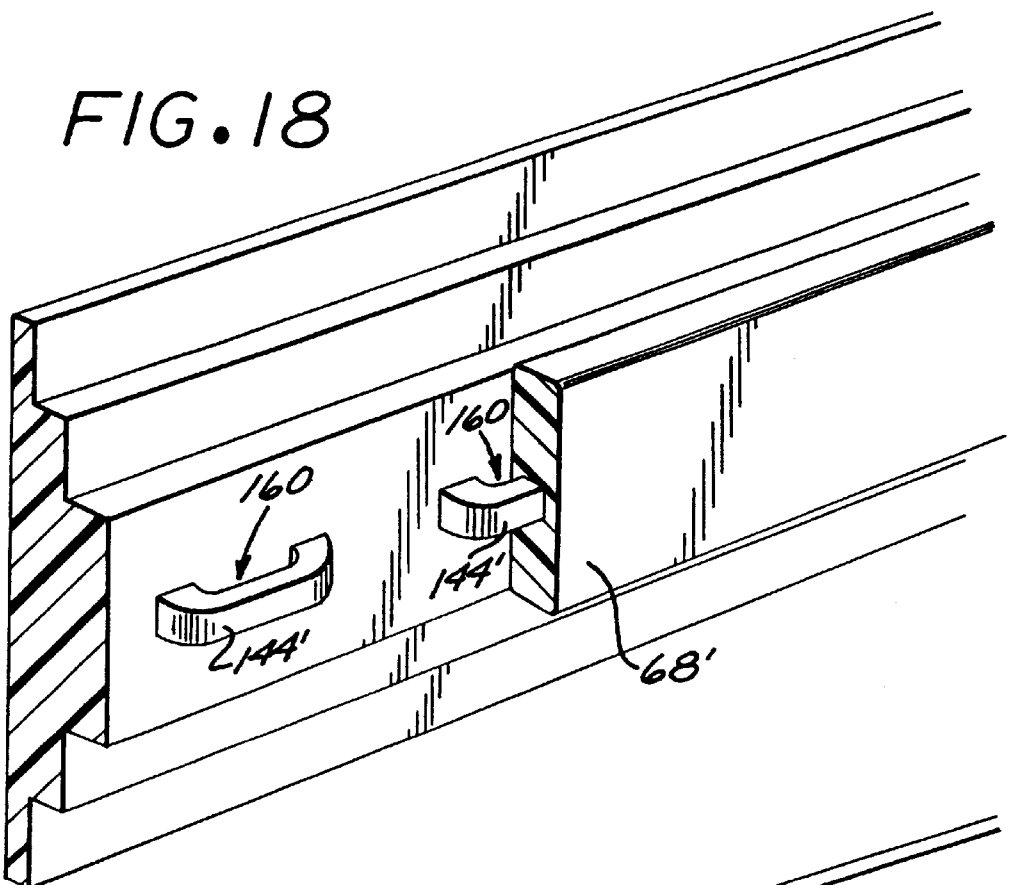
FIGS. 18 and 19 show alternate techniques of locking the inner plastic member to the external plastic member comprising the pen cartridge of FIG. 1.
Figure 19:
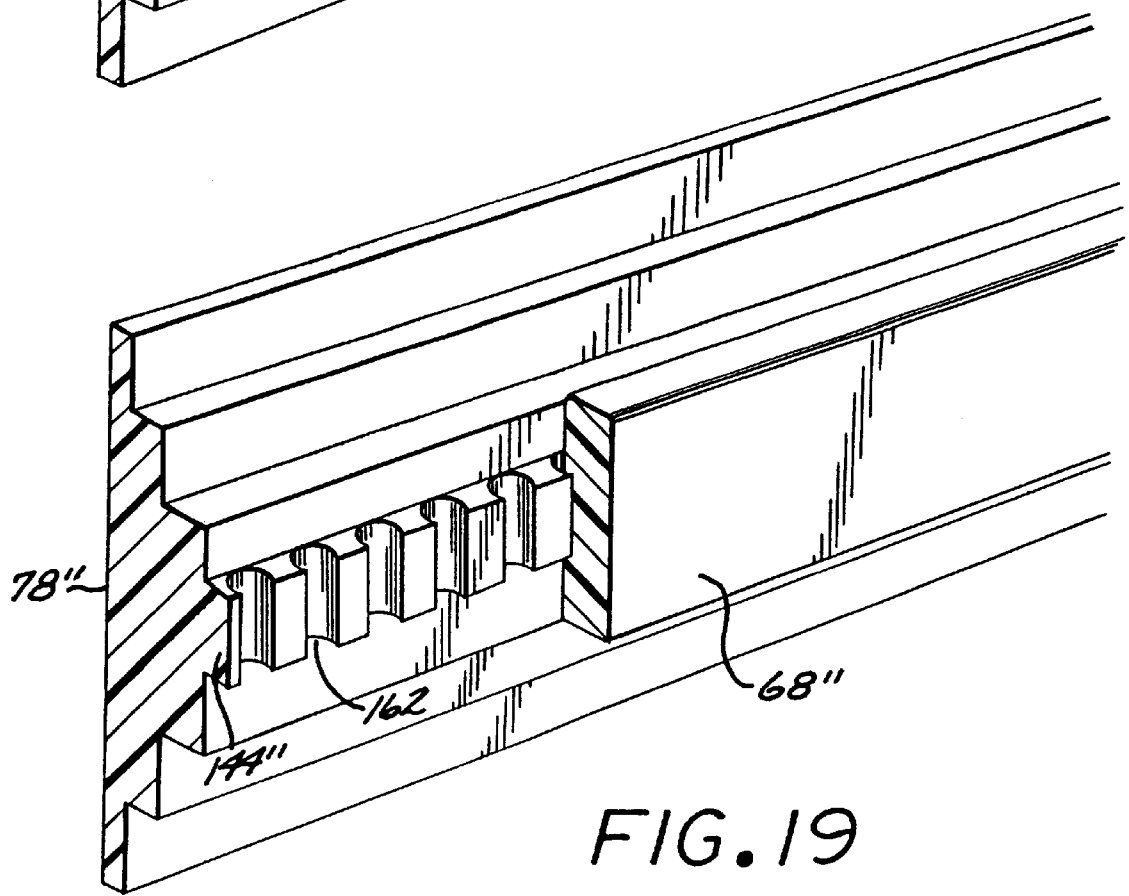

FIGS. 18 and 19 illustrate two alternate embodiments of the locking features which may be formed on the inner surface of the frame member 78, instead of the undercut rib 144. Thus, FIG. 18 shows a frame member 78' which employs locking features 144', essentially small handle-like features with an opening 160 into which the molten plastic flows when the inner member 68' is molded. FIG. 19 shows a frame member 78" which includes locking features 144" which include rounded undercut openings 162 formed therein. The molten plastic flows into the undercut openings 162 when the inner member 68" is molded.

Another aspect of the invention is shown in FIGS. 20–32. This aspect is illustrated in a drum printer application, but it is applicable to other types of swath printers as well. The drum printer utilizes the spring bag pen cartridge described above with respect to FIGS. 1–19, and a closed auxiliary ink reservoir. There are two illustrated embodiments. The first is a single cartridge swath printer. The paper is secured to the periphery of the drum by a vacuum (or other attachment means, such as adhesive tape), and the drum rotated relative to a cartridge carriage. The carriage is moved in two alternate ways. One way is to incrementally step or move the carriage from one swath to the next. The other is a continuous, very slow movement, so that the printhead moves in a spiral relative to the paper surface. To provide higher ink volume capacity in accordance with this aspect of the invention, a closed auxiliary reservoir is connected via a tube to the spring bag internal reservoir. For the single cartridge drum printer, the auxiliary reservoir is held by a platform mounted on the carriage. As the carriage moves, the auxiliary carriage moves with the carriage. To prevent ink from unduly sloshing around in the auxiliary reservoir, the use of the continuous, slow movement of the cartridge carriage works best. For a multiple cartridge printer using two cartridges, each having a different color ink, one auxiliary reservoir is held on a platform mounted on the cartridge carriage as in the single cartridge embodiment, and a second reservoir mounted on a platform secured to the printer body, there being relative motion between the second reservoir and the cartridge and paper. In each embodiment, the auxiliary reservoirs are connected via flexible tubes to the respective internal reservoir of the spring bag cartridge through the existing fill hole defined through the softer inner plastic material. The auxiliary reservoir for each embodiment is a flat, high capacity bag. The inner diameter of the tubes is sufficient to supply ink under heavy printing loads to maintain the ink supply in the primary spring-bag reservoir; the system does not rely on capillary flow through the tubes.

FIGS. 20–26 illustrate the single cartridge embodiment of a swath printer 200 with an auxiliary reservoir. The printer includes a printer body 202 which provides support for the printer elements. The printer includes a hollow cylindrical drum 204, which is perforated with a number of holes 206. The drum 204 is mounted on the body 202 for rotational movement about its axis, and is driven by motor 208. A source of vacuum (not shown) is connected to the interior of the hollow drum, which tends to draw air into the interior of the drum through the holes 206. This tends to secure a print medium such as paper tightly about the periphery of the drum for printing operations.

The printer 200 further includes a cartridge 50 having a spring bag reservoir 62, mounted in a carriage 210 for movement along a carriage axis which extends generally parallel to the center axis of the drum 20. The carriage is mounted on rods 212 and 214 for sliding movement along the extent of the drum over which printing operations are to be performed. The carriage 210 is driven by a leadscrew 218 which is rotated by motor 220. The carriage 210 has mounted thereon a leadscrew follower nut (not shown) which is engaged on the leadscrew. The motor 220 can be operated to rotate the leadscrew 218, which in conjunction which the leadscrew follower translates the rotation movement of the leadscrew into linear movement of the follower and carriage.

The motors 208 and 220 can be operated to precisely position a given point on the print medium surface relative to the printhead carried by the spring bag cartridge 50.

In accordance with the invention, the swath printer further includes a closed auxiliary reservoir 230, connected to the primary reservoir 62 of the spring bag cartridge 50 by a flexible tube 240. In this exemplary embodiment, the auxiliary reservoir 230 is carried on the cartridge carriage 210, which includes a reservoir platform 244. Thus, as the carriage is moved along the carriage axis during printing operation, the auxiliary reservoir 230 is carried with the carriage. Because the carriage typically moves slowly in a continuous movement, or in small incremental swath steps, the liquid ink held in the reservoir 230 is not subjected to large accelerations/decelerations, and so does not slosh about within the reservoir to a large degree.

The tube 240 has a primary reservoir end 240A which is connected to the existing fill port 130 formed in the frame 60 of the cartridge 50. The external diameter of the tube 240 is selected to be slightly larger than the nominal opening size of the fill port 130. After the primary cartridge reservoir has been filled with ink as described above, the tube end 240A is connected to the fill port through a right angle "L" fitting 243 (FIG. 23). This interconnection between the tube end 240A and the inner plastic member 68 is illustrated in FIG. 23.

The tube 240 is further connected at its second end 240B to the auxiliary reservoir 230, as illustrated in FIGS. 23 and 24. The reservoir 230 includes a fitment element 232 which provides a structure to attach the tube 240. The fitment 232 includes a tube 232A extending transversely to a "q" shaped fitment flat structure portion 232B. There is a tube opening 232C extending through the tube and flat structure portion. The flat structure portion 232B has a flat surface 232E which is attached to the bag material, and a series of channels 232D formed in the surface opposed to the flat surface. The channels lead to the tube opening 232C, and serve to prevent the opening from being closed by the bag material as the bag empties and collapses. Thus, the channels allow the bag to be more completely emptied of ink. The fitment 232 in the exemplary embodiment is a one piece structure molded from low density polyethylene.

In a preferred embodiment, the auxiliary reservoir 230 is a bag fabricated of a flexible material impervious to the liquid ink, and can be the same material as that used for the spring bag membranes in the spring bag cartridge. A suitable bag material is a commercially available assembly of two thin layers adhered together, a two mil thick layer of polyethylene, and a 0.75 mil thick layer of polyester (MYLAR) on the bag exterior. The auxiliary reservoir bag can be fabricated in accordance with the following exemplary method.

First, a piece of the bag material about six inches wide and twenty-four inches long is cut. Next, a ¼ inch hole is punched in the very center of the bag material for the fitment element 232. The piece of bag material is placed over the fitment 232 with the fitment tube 232A inserted through the hole in the material. The fitment position is adjusted so that its long dimension is parallel to the long side of the piece of material. Next, a two-inch-by-two-inch piece of teflon cloth with a ¼ inch hole punched in it is placed over the fitment tube 232A, so that the bag material and teflon cloth sandwich the fitment element 230. A fitment welder is used to heat weld the fitment to the bag material. The fitment welder can be a hollow aluminum cylinder attached to a soldering iron, with the cylinder defining a clearance opening larger than the diameter of the fitment tube. The temperature can be controlled by unplugging the soldering iron, etc., to get the best fitment seal. A cylinder of rolled teflon cloth is placed over the fitment tube 232A to protect it from melting. A second cylinder of rolled teflon cloth is placed inside the clearance hole of the fitment welder. The welder is carefully lowered over the fitment tube and pressed down to melt the bag material and the fitment together. This welding will require a rather fast rolling motion to prevent melting the fitment tube or excess melting of the bag but also must assure a complete bag to fitment seal.

Once the fitment is in place, the periphery of the bag can be sealed with impulse heat sealers typically used on plastic bags. The piece of bag material is folded over in the long direction to end up with a bag six-inches-by-twelve inches with the fitment tube protruding out of one side wall of the bag. The long edges of the bag material are lined up, and the short end of the bag is heat sealed about 11½ inches from the fitment end. A second seal right can be placed next to the first one for added sealing security. Then each of the long edges of the bag are sealed about one inch from the edge. A second seal can be placed right next to the first seal for added sealing security. The bag should now have a sealed area of about four-inches-by-eleven-and-one-half-inches with the fitment tube 232A protruding from one side wall of the bag. When the bag is filled with ink, it will have a typical height of about 1½ inches.

The auxiliary reservoir bag 230 can be filled by at least two exemplary methods. One method is syringe filling. Ink is pulled into a syringe, the syringe is connected to the bag fitment tube through a luer fitting, and the ink is pushed into the bag. Another method is siphon filling. The bag 230 is placed at a lower level than the free liquid level in an ink bottle. A tube is placed in the ink bottle. A "tee" is connected between a luer fitting on the bag 230 and the tube from the bottle. A syringe is attached to the open end of the "tee." When the syringe is used to evacuate the tube and bag of air, the ink that is pulled out of the bottle starts a siphoning action into the bag 230. Once the bag has the required amount of ink in it, the luer fitting can be capped with a male luer plug. To remove any air bubbles, the bag is oriented to get any air bubbles to collect at the fitment and the plug is opening enough to let the air escape. The auxiliary reservoir bag 230 can be refilled by the same techniques.

Figure 9:
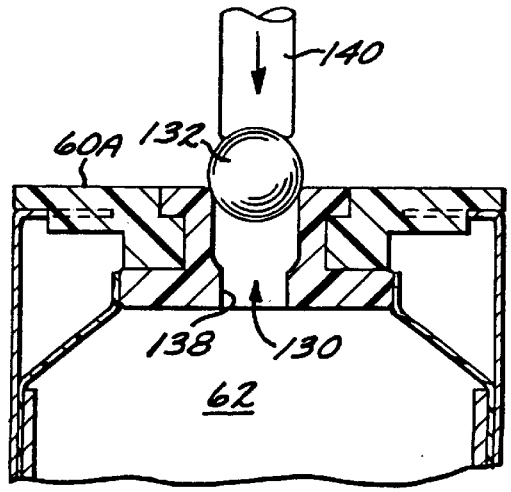
FIG. 9 is a cross-sectional view similar to FIG. 7 but showing the insertion of the sealing ball.

The cartridge 50 shown in FIGS. 1–19 is employed in the printer 200, with modifications to permit the connection of tube 240. Consider a cartridge 50 which has been filled with ink and the fill port sealed with a ball 132 as shown in FIG. 9. With the cartridge oriented as shown in FIG. 9, the ball 132 is pushed into the cartridge reservoir 62. To permit a sealed connection to the reservoir at the fill port 130, the fill port opening is enlarged with a drill bit, e.g., a number 21 bit for a port opening size of 0.159 inches, either by hand or with a drill press. Using a clean stainless steel #10/32 screw, threads are formed in the inner plastic member 68 defining the fill port opening by threading the screw into the opening. The threads are formed only in the inner plastic material 68, and do not expose or cut into the external plastic frame member 78. The screw is then withdrawn and replaced with a #10-32 "L" fitting 243 with a barbed end. The L fitting is turned in as far as it will go and still have the barb end point away from the pen snout. The threaded engagement between the fitting and the port opening sidewall results in a joint which is leak-free over a range of environmental parameters to which an ink-jet cartridge is typically exposed. The tube end 240A is then attached to the barb end of the fitting 243 by pressing the tube end over the barb. The length of tubing is preferably kept as short as feasible (e.g., less than 6 inches) to reduce the back pressure but still allow connection to the bag 230. At least some portion of the tube 240 is capable of being pinched off with a clamp. A tubing clamp is placed on the tube, and a male luer barbed connector is pressed onto the tube end. To reset the spring bag reservoir, a syringe is attached to the tube 240, to pull out the air in the cartridge reservoir until ink comes out into the tube. The clamp is closed and the syringe removed. The cartridge is ready for any testing and may be connected to an auxiliary bag at any time.

Of course, instead of starting the process with a filled, sealed cartridge, one could start the process with a cartridge whose reservoir is empty. If the fill port 130 is sealed with a ball 132, the ball can be pushed into the reservoir as before. If the port 132 is not sealed, this step will of course not be necessary. The port is opened with a drill bit, threaded with a screw, the L fitting installed, and a tube connected to the barbed end of the L fitting. The spring bag reservoir can then be filled through the tube, and air drawn out with a syringe as described above. The cartridge is then ready to be connected to the auxiliary bag 230.

To attach the cartridge 50 to the auxiliary reservoir bag 230, it is helpful if a tube is attached to the L fitting attached to the fitment tube 232A and capped with a female luer fitting and a luer plug. In an exemplary embodiment, the tube has an inner diameter of ⅛ inches to permit adequate flow and without relying on capillary flow. The end of the bag tube is held above the height of the bag itself, and the luer plug removed. The male luer fitting attached to the cartridge tube is twisted into the female luer at the end of the bag tube. The clamp on the cartridge tube is opened. While handling cartridges with untaped printheads connected to the reservoir bag, care should be taken to keep the cartridge nozzle plate within four vertical inches of the top of the bag 230 or cartridge depriming or drooling may result. It is desirable to clamp off the cartridge tube if the cartridge 50 and bag 230 are being moved around. The amount of ink in the cartridge reservoir 62 can be decreased when the cartridge is attached to the bag 230 by raising the cartridge relative to the bag and increased by lowering the cartridge relative to the bag.

In a particular exemplary embodiment, it has been found that the cartridge-bag system will work well with the bag's upper surface between one and four inches below the cartridge nozzle plate. The system can accommodate a moderate degree of air, though the tube from the cartridge to the auxiliary reservoir should be kept below the top of the cartridge to avoid the formation of an air lock.

The cartridge spring-bag reservoir creates a negative pressure as it collapses, and the pressure gets more negative throughout the collapse. The auxiliary reservoir bag 230 will also create a negative pressure as it collapses but of much less magnitude. To consider the operation of the continuous refill system, assume that the spring bag cartridge reservoir is nearly empty, and that the auxiliary reservoir bag is full and mounted below the cartridge reservoir. Further assume that the cartridge reservoir and auxiliary reservoir are connected with a tube with a valve blocking flow between them. Now assume that the valve is opened. Ink will flow up hill from the bag 230 to the cartridge reservoir so long as the suction (negative pressure) in the cartridge reservoir is greater than necessary to collapse the auxiliary bag and pull the ink uphill. The cartridge reservoir will refill to an equilibrium point depending on the height difference between the cartridge reservoir and the auxiliary bag, the cartridge and bag pressure-volume relationships, and the starting ink volumes in the cartridge reservoir and the auxiliary reservoir. This equilibrium point will vary as the auxiliary bag is emptied of ink. The location of the tube connection to both the cartridge reservoir and the auxiliary reservoir will affect the effective cartridge/auxiliary bag height difference. The height differential at issue for this closed system is the height differential between the free surface of the ink within the auxiliary reservoir and the ink meniscus formed at the cartridge printhead.

There is a narrow range of cartridge/auxiliary reservoir heights that will work correctly; too small a height differential and the cartridge reservoir will overfill and drool ink from the printhead due to too low a back pressure, too great a height differential and the cartridge reservoir will underfill and will not be able to print due to too high a back-pressure. It is desired that the system be set up so that the spring-bag plates never touch the outer frame covers due to overfilling, and the plates do not collapse completely until the auxiliary reservoir ink supply has been depleted. The height difference can determined empirically by testing a statistically significant population of cartridges. The ideal height differential is one which will not cause a statistically "worst case" cartridge to drool or puddle, i.e. a cartridge having a spring-bag reservoir with the highest back pressure at which the system will be designed to operate. These cartridges have higher than normal back pressure, and as such, may cause ink to flow when other cartridges may not. To ensure these "worst case" cartridges do not puddle or drool, the vertical height difference is increased from a nominal distance to give some margin. The nominal distance is based on average back pressures for a given "filled" cartridge, say 40 cc of ink which may correspond to 3 inches of water. The typical range of back pressure for a spring-bag cartridge is between 2 and 10 inches of water, with a typical preferred operating range of 3–7 inches for production cartridges. The print head type and spring construction will have some effect on the desired operating range.

FIGS. 27 and 28 show an alternate embodiment of a drum printer 200' employing the auxiliary ink reservoir system. The printer 200' has two spring-bag reservoir cartridges 50' and 50" mounted in respective carriages 210' and 210", each mounted on carriage support structure 215. The orientation of the two cartridges is shown in the cross-sectional view of FIG. 28. Each is oriented such that its longitudinal axis if extended would intersect the center of the drum 204.

Figure 20:
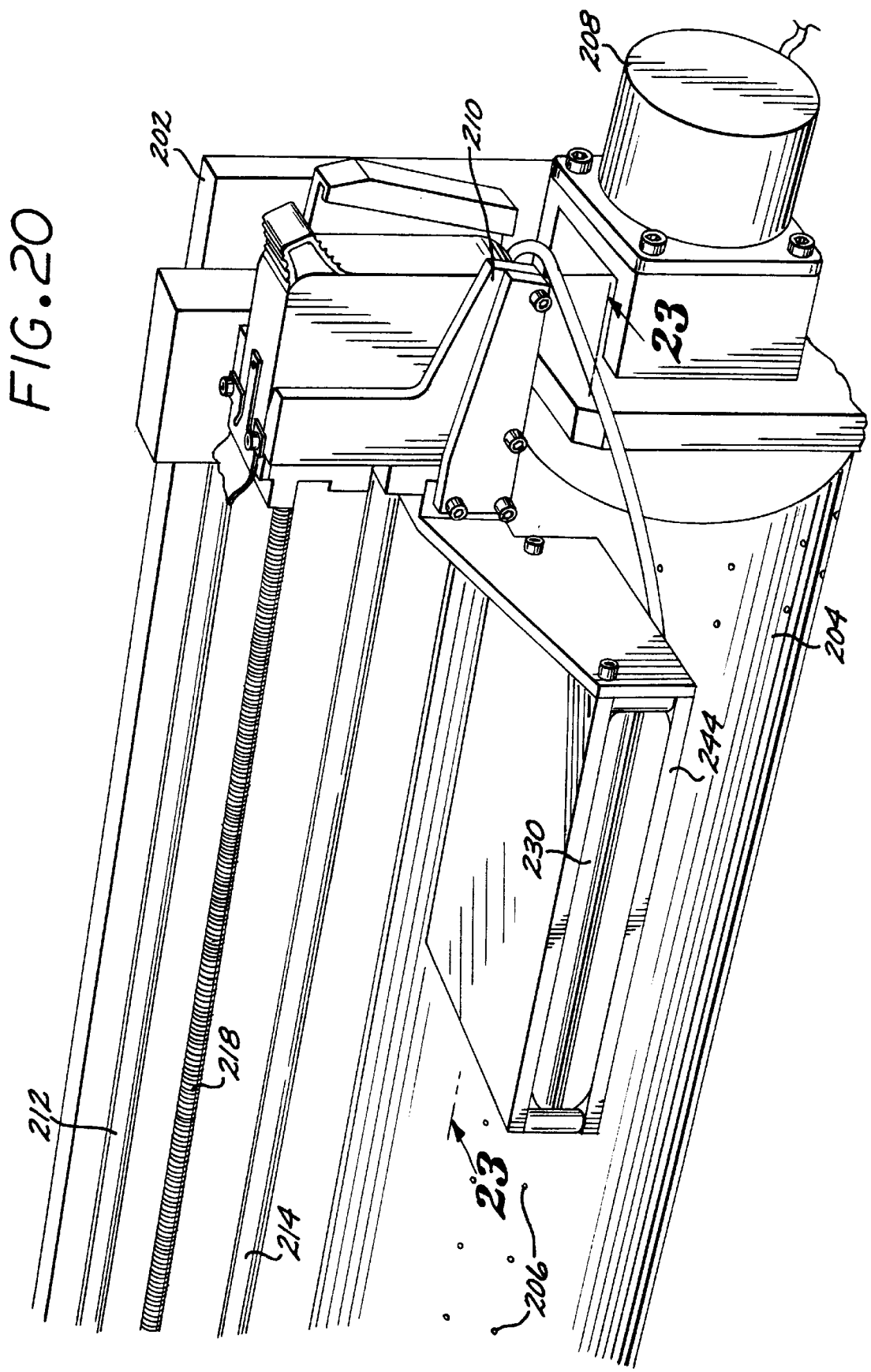
FIG. 20 is a partial isometric view of a spring bag cartridge swath printer employing an auxiliary reservoir in accordance with a further aspect of the invention.
Figure 21:
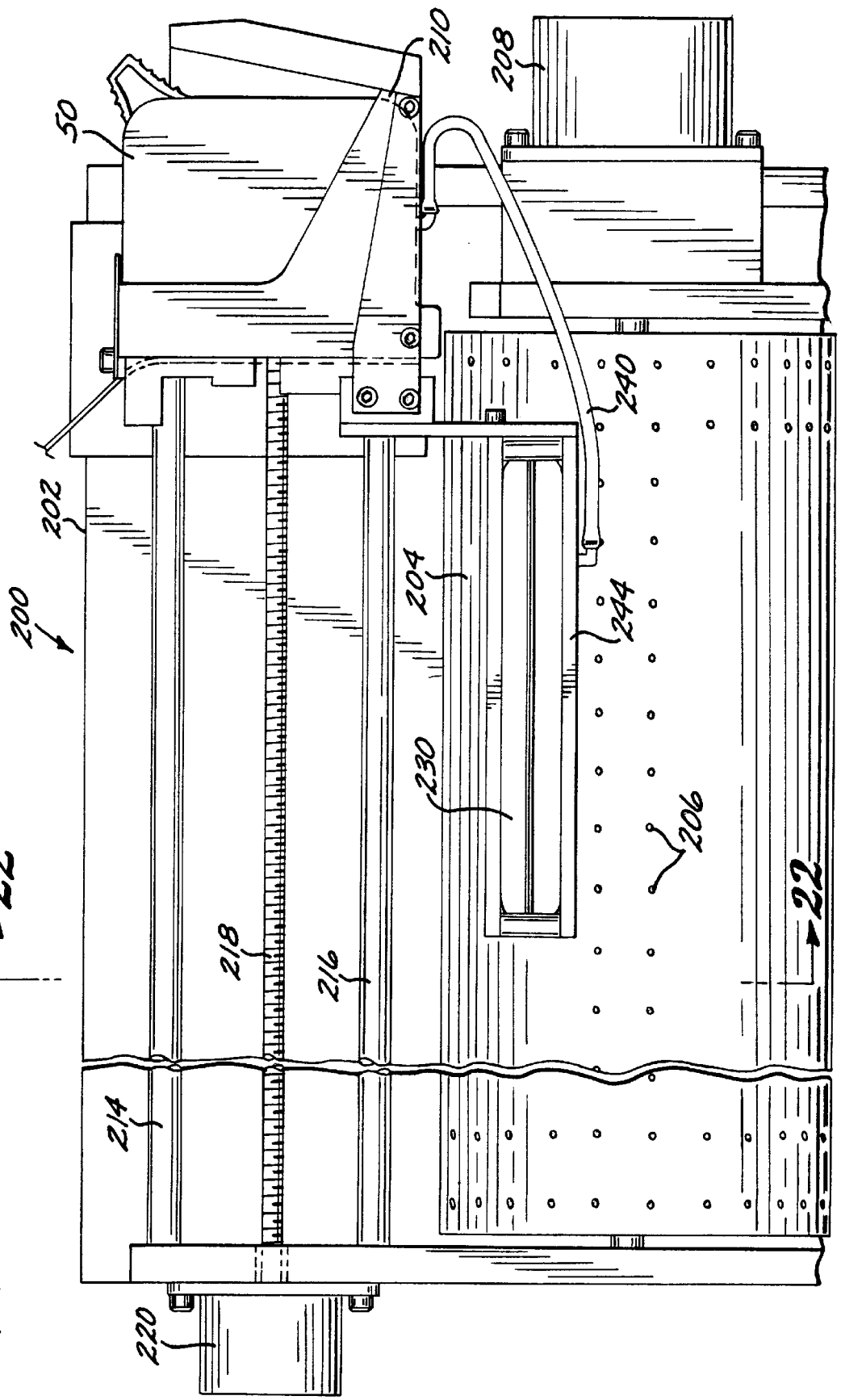
FIG. 21 is a front view of the swath printer of FIG. 20.
Figure 22:
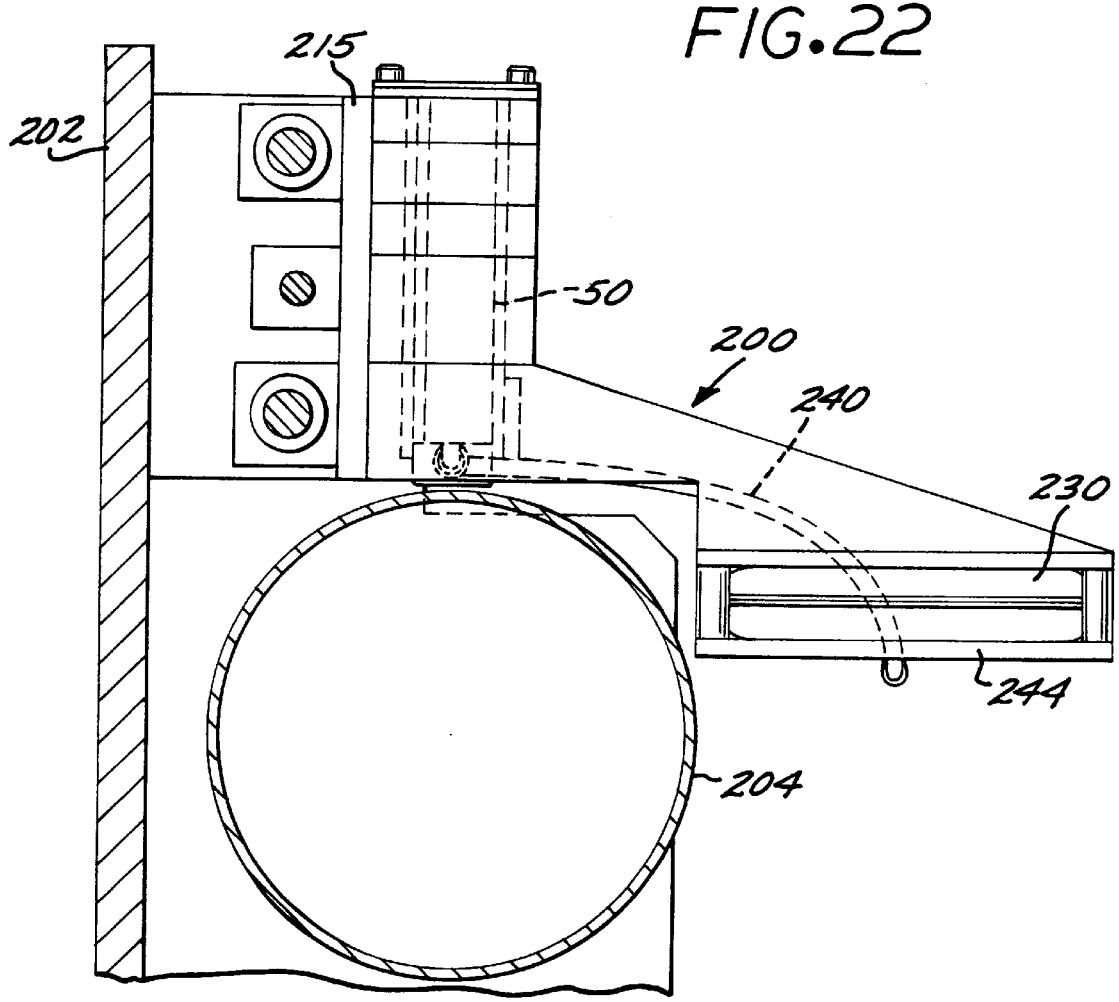
FIG. 22 is partial cross-sectional view, taken along line 22—22 of FIG. 21.
Figure 25:
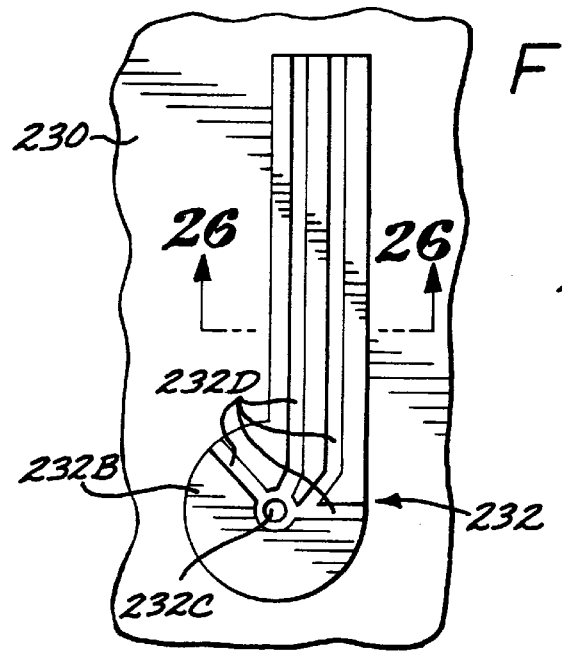
FIG. 25 is a close up view of the fitment element and the surrounding portion of the auxiliary bag.bottom cross-sectional view of the auxiliary reservoir bag.
Figure 26:
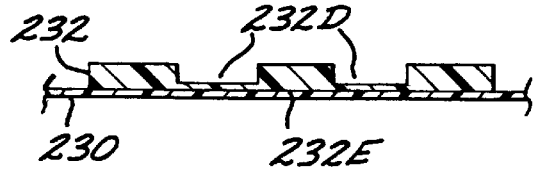
FIG. 26 is a cross-sectional view of the fitment element, taken along line 26—26 of FIG. 25.
Figure 30:
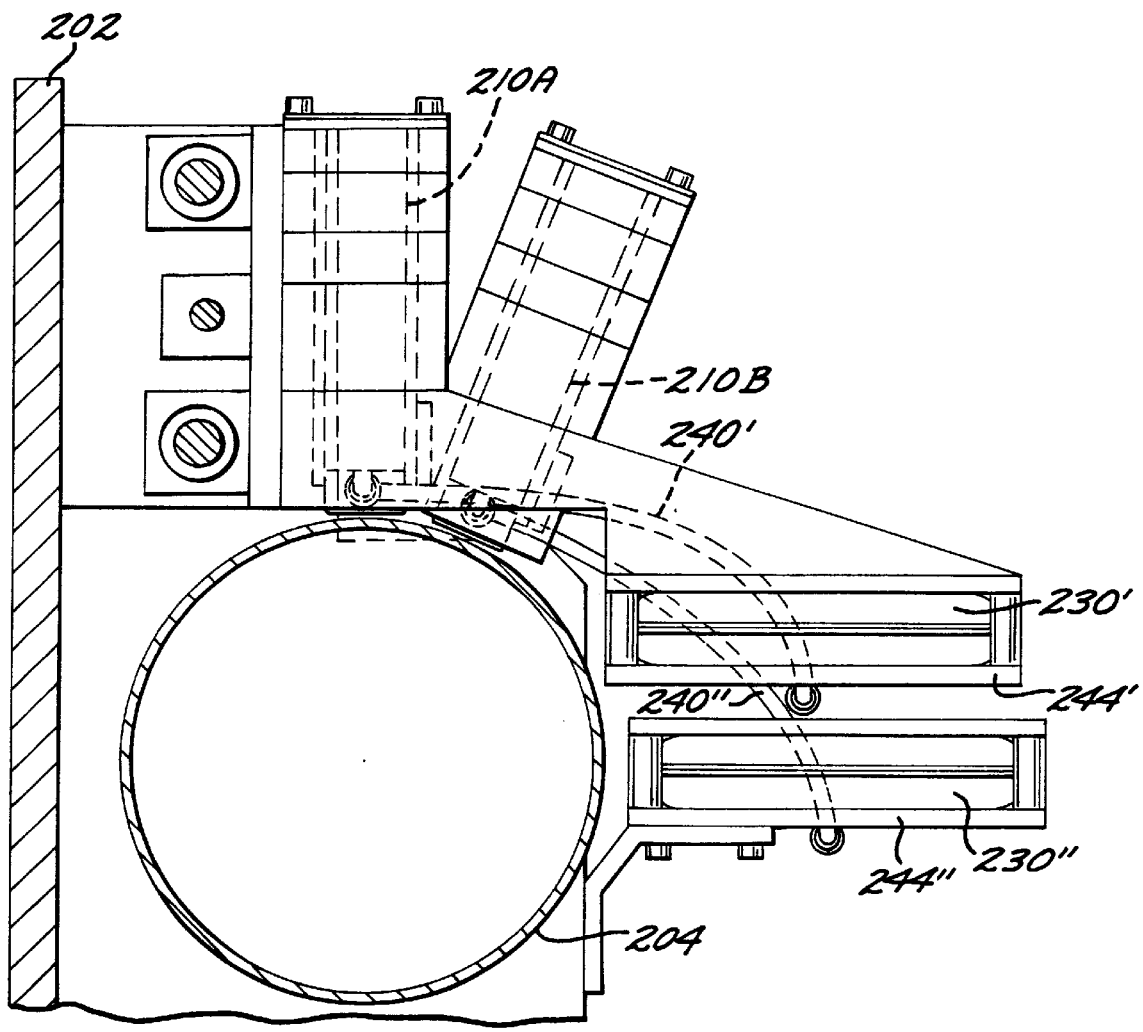
FIG. 30 is a cross-sectional view of the swath printer of FIG. 29, taken along line 30—30 of FIG. 29.
Figure 31:
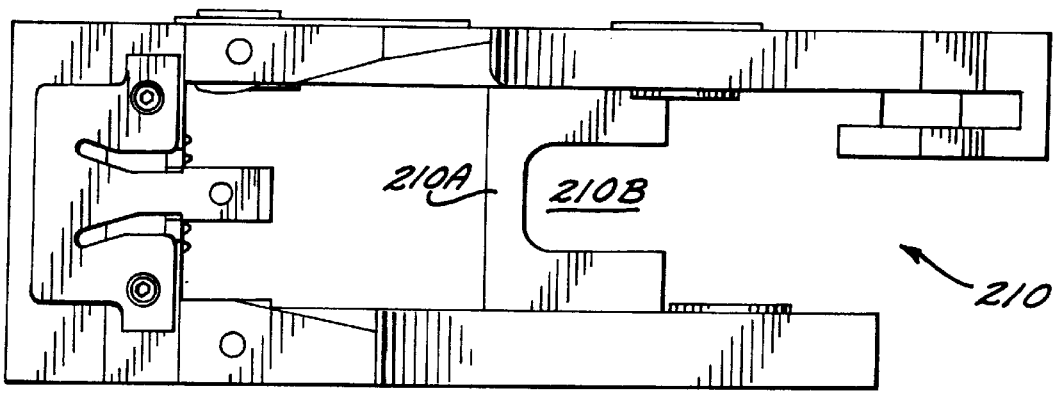
FIG. 31 is a bottom view of the cartridge carriage employed in the swath printer.
Figure 32:
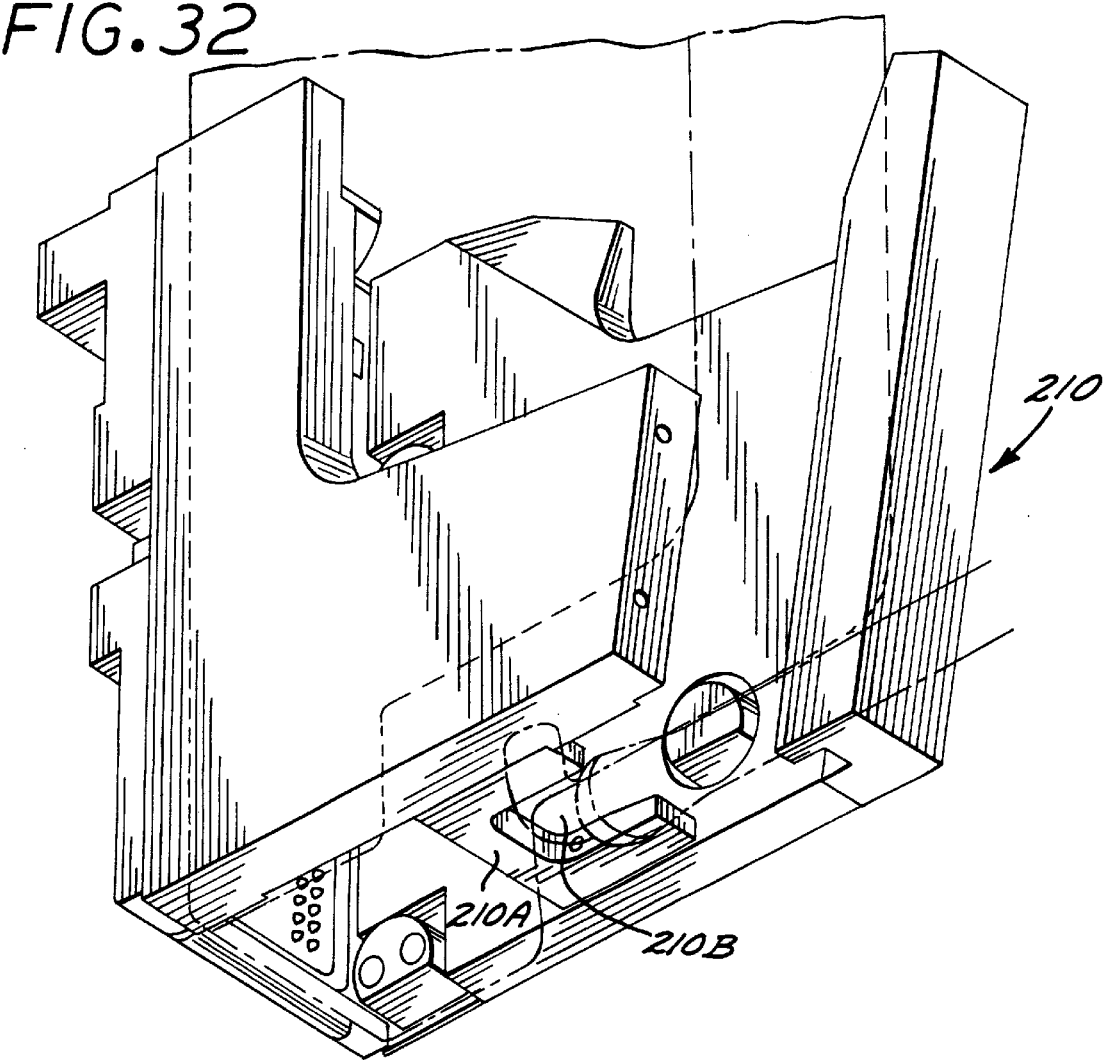
FIG. 32 is an isometric view of the cartridge carriage of FIG. 31.

The auxiliary reservoir 230' for cartridge 50' is mounted on platform 244' in a similar manner as in the printer 200 embodiment shown in FIGS. 20–21. A tube 240' connects the primary reservoir in the cartridge 50' and the auxiliary reservoir 230'. Thus, the reservoir 230' is carried along with the cartridge 50' as the carriage structure 215 is advanced/retracted by the leadscrew 218.

The auxiliary reservoir 230" for cartridge 50" is mounted on platform 244", which is secured to the printer body 202. A tube 240" connects the primary reservoir in the cartridge 50" and the auxiliary reservoir 230".

When the cartridge and auxiliary reservoir are not installed in a printer, e.g., during shipping or in inventory, there is the risk that the height differential between the cartridge and auxiliary reservoir will not be at the correct differential to prevent ink flow from the reservoir to the cartridge, allowing ink drool from the print head. To prevent this, a shut-off valve will typically be installed in the fluid path between the auxiliary reservoir and the cartridge to prevent ink flow when the cartridge/auxiliary reservoir are not installed in a printer. This may be a simple pinch valve for closing the tube, for example. Such valves are schematically illustrated in FIG. 24 as elements 241A and 241B.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An ink-jet printer for ink-jet printing onto a print media, comprising:

an ink-jet cartridge including an ink-jet print head and an internal closed spring-bag primary reservoir in fluid communication with said print head for holding a first supply of liquid ink under negative pressure, said primary reservoir including at least one movable side wall and an internal spring for biasing said at least one movable side wall against collapsing as ink is withdrawn from said reservoir and ejected from said print head onto a print medium during printing operations, said cartridge further comprising a rigid housing structure enclosing said reservoir and supporting said print head, and a passageway extending through said housing structure and in fluid communication between an ink replenishment port on an external surface of said housing structure and the primary reservoir;

a closed auxiliary reservoir external to the cartridge for holding a second supply of liquid ink, said auxiliary reservoir comprising a sealed collapsible bag;

a connection tube running between the ink replenishment port of the housing structure and the auxiliary reservoir for providing a closed fluid path which is uninterruptible during normal printing operation to provide passive ink replenishment from said auxiliary reservoir to said primary reservoir during normal printer operation, said negative pressure of said primary ink supply drawing ink from said auxiliary reservoir as ink is ejected from said printhead.

2. The printer of claim 1 wherein said auxiliary reservoir comprises at least one movable wall element.

3. The printer of claim 1 wherein said collapsible bag comprises a sheet of flexible material impervious to liquid ink.

4. The printer of claim 3 wherein the auxiliary reservoir further includes a fitment structure attached to said sheet of flexible material, said fitment structure including a planar surface attached to said sheet, an opening defined through the planar surface and the sheet, and a tube connecting structure for attaching an end of said tube in communication with said opening.

5. The printer of claim 1 wherein said primary and auxiliary reservoirs and said connection tube are cooperatively arranged so as to provide automatic ink replenishment of said primary reservoir without operation of any valves in said closed fluid path and without the use of any pump or forced applying means other than said negative pressure of said primary ink supply to actively pump ink from said auxiliary reservoir to said primary reservoir.

6. The printer of claim 1 further comprising means for positioning said auxiliary reservoir at a height relative to said primary reservoir to maintain a sufficient liquid ink pressure head in said closed fluid path to provide continuous replenishment of said primary ink reservoir from said auxiliary reservoir.

7. The printer of claim 6 wherein said liquid ink pressure head is insufficient to diminish said negative pressure sufficiently so as to allow ink to drool from the print head.

8. The printer of claim 1 wherein said primary and auxiliary reservoirs and said connection tube are cooperatively arranged so as to provide automatic ink replenishment of said primary reservoir without operation of any sensors to indicate a level of ink in said primary reservoir.

9. The printer of claim 1 wherein said means for effecting relative movement comprises:

a drum for holding a print medium, said drum comprising a cylinder having an axis and a circumferential drum surface against which the print medium is held during printing operations;

apparatus for holding the print medium in contact with the circumferential drum surface during printing operations;

carriage means for holding said spring bag cartridge in a closely arranged position relative to a surface of said drum;

means for rotating the drum about the drum cylinder axis so as to move the print medium in relation to the printhead of the cartridge; and means for moving the carriage along a carriage axis, said carriage axis extending parallel to drum cylinder axis.

10. The printer of claim 1 wherein said means for effecting relative movement comprises a carriage which translates along a carriage axis and which holds the cartridge in position relative to a print medium, and wherein said auxiliary reservoir is secured relative to said carriage and translates along said axis as said carriage is translated.

11. The printer of claim 10 further including a second cartridge with a second primary reservoir, a second auxiliary reservoir and a second connection tube running between the second primary reservoir and said second auxiliary reservoir, said second cartridge held by said carriage and translated along the carriage axis with said first cartridge, said printer further including a stationary printer body, said carriage translating relative to said body, and wherein said second auxiliary reservoir is secured relative to said body and remains stationary as said carriage is translated along said axis during printing operation.

12. The printer of claim 1 wherein said means for effecting relative movement comprises a carriage which translates along a carriage axis and which holds the cartridge in position relative to a print medium, said printer further includes a stationary printer body, said carriage translating relative to said body, and wherein said auxiliary reservoir is secured relative to said body and remains stationary as said carriage is translated along said axis during printing operation.

13. A method of replenishing liquid ink in a closed spring-bag primary reservoir in an ink-jet printing system, comprising the following steps:

providing an ink-jet cartridge including an ink-jet print head and a closed spring-bag primary reservoir in fluid communication with said print head for holding a first supply of liquid ink under negative pressure, said primary reservoir including at least one movable side wall and an internal spring for biasing said at least one movable side wall against collapsing as ink is withdrawn from said reservoir and ejected from said print head onto a print medium during printing operations;

providing a closed auxiliary reservoir for holding a second supply of liquid ink, said auxiliary reservoir comprising a sealed collapsible bag;

providing a closed ink path running between the primary reservoir and the auxiliary reservoir, said closed ink path being uninterruptible during normal printing operation, to provide passive ink replenishment from said auxiliary reservoir to said primary reservoir during normal printer operation; and operating the cartridge print head to eject ink therefrom during printing operations, thereby depleting said first ink supply and increasing said negative pressure, said increase in negative pressure passively drawing ink through said closed ink path and into said fill port from said second supply of ink to replenish said first ink supply until an equilibrium negative pressure is achieved in said primary reservoir.

14. The method of claim 13 further comprising the step of effecting relative movement between the ink-jet printhead and a print medium during printing operations.

15. The method of claim 13 wherein said auxiliary reservoir comprises at least one movable wall element.

16. The method of claim 13 wherein said primary and auxiliary reservoirs and said connection tube are cooperatively arranged so as to provide automatic ink replenishment of said primary reservoir without operation of any valves in said closed fluid path.

17. The method of claim 13 further comprising the step of positioning the auxiliary reservoir at a height relative to the primary reservoir to maintain a sufficient liquid ink pressure head in the closed fluid path to provide continuous replenishment of the primary ink reservoir from the auxiliary reservoir as ink is ejected from the print head during printing operations.

18. The method of claim 17 wherein said height is selected such that the liquid ink pressure head is insufficient to diminish the negative pressure sufficiently so as to allow ink to drool from the print head.

19. The method of claim 13 wherein the primary and auxiliary reservoirs and the closed fluid path are cooperatively arranged so as to provide automatic ink replenishment of said primary reservoir without operation of any sensors to indicate a level of ink in said primary reservoir.

20. A method of replenishing liquid ink in a closed spring-bag primary reservoir in an ink-jet printing system, comprising the following steps:

providing an ink-jet cartridge including an ink-jet print head and a closed spring-bag primary reservoir in fluid communication with said print head for holding a first supply of liquid ink under negative pressure, said primary reservoir including at least one movable side wall and an internal spring for biasing said at least one movable side wall against collapsing as ink is withdrawn from said reservoir and ejected from said print head onto a print medium during printing operations, said cartridge including a fill port extending through a cartridge frame and in communication with the primary reservoir;

providing a closed auxiliary reservoir for holding a second supply of liquid ink, said auxiliary reservoir comprising a sealed collapsible bag;

providing a closed ink path running between the fill port of the cartridge and the auxiliary reservoir, said closed ink path being uninterruptible during normal printing operation, to provide passive ink replenishment from said auxiliary reservoir to said primary reservoir during normal printer operation; and operating the cartridge print head to eject ink therefrom during printing operations, thereby depleting said first ink supply and increasing said negative pressure, said increase in negative pressure passively drawing ink through said closed ink path and into said fill port from said second supply of ink to replenish said first ink supply until an equilibrium negative pressure is achieved in said primary reservoir.

21. The method of claim 20 wherein said cartridge print head faces a first direction, and said fill port is formed in said cartridge frame to also face in said first direction.

22. The method of claim 20 wherein said step of providing a closed ink path comprises connecting a sealed tubing system between said fill port and said auxiliary reservoir.

23. The method of claim 22 wherein said primary reservoir of said provided cartridge is filled with a first supply of ink and said fill port is closed with a sealing element, and wherein said step of connecting said sealed tubing system includes:

opening said fill port by displacing said sealing element; and connecting a tube element end to said fill port.

24. The method of claim 23 wherein said step of opening said fill port comprises the step of displacing said sealing element into said primary reservoir.

25. The method of claim 24 wherein said sealing element is a spherical ball member, and said displacing step includes pushing the ball member from said fill port into the primary reservoir.

26. The method of claim 22 wherein said tubing system includes a sealable port, and said step of connecting said tubing system includes the step of evacuating air bubbles from said closed path through said sealable port.

27. The method of claim 20 wherein the cartridge frame includes an external frame structural member fabricated from a first rigid plastic material and an interior frame member fabricated from a second plastic material which is softer than said first plastic material, and wherein the ink fill port extends through the external frame structural member and said interior frame member.

28. The method of claim 27 wherein the second plastic material lines said fill port through an opening formed in said external plastic structural member.

29. The method of claim 28 wherein the cartridge comprises first and second flexible membranes which are fastened to said inner frame member to define said primary reservoir, said first membrane defined by said movable side wall.

30. A method of replenishing liquid ink in a closed spring-bag primary reservoir in an ink-jet printing system, comprising the following steps:

providing an ink-jet cartridge including an ink-jet print head and a closed spring-bag primary reservoir in fluid communication with said print head, the primary reservoir holding a first supply of liquid ink under negative pressure, said primary reservoir including at least one movable side wall and an internal spring for biasing said at least one movable side wall against collapsing as ink is withdrawn from said reservoir and ejected from said print head onto a print medium during printing operations, said cartridge including a ink fill port extending through a cartridge frame and in communication with the primary reservoir;

providing a closed auxiliary reservoir holding a second supply of liquid ink, said auxiliary reservoir comprising a sealed collapsible bag;

providing a closed ink path running between the fill port of the cartridge and the auxiliary reservoir, said closed ink path being uninterruptible during normal printing operation, to provide passive ink replenishment from said auxiliary reservoir to said primary reservoir during normal printer operation, wherein a free ink surface of said second ink supply in said auxiliary reservoir is positioned at a height below a height of said print head such that said negative pressure is not destroyed due to ink flow from said second ink supply, resulting in ink drool from said printhead;

operating the cartridge print head to eject ink therefrom during printing operations, thereby depleting said first ink supply and increasing said negative pressure, said increase in negative pressure passively drawing ink through said closed ink path and into said fill port from said second supply of ink to replenish said first ink supply until an equilibrium negative pressure is achieved in said primary reservoir.

31. The method of claim 30 wherein ink is drawn from the auxiliary reservoir through a fitment element attached to a bag wall, and wherein the fitment element includes a tube attaching feature.

32. The method of claim 30 wherein said cartridge print head faces a first direction, and said fill port is formed in said cartridge frame to also face in said first direction.

33. The method of claim 30 wherein said step of providing a closed ink path comprises connecting a sealed tubing system between said fill port and said auxiliary reservoir.

34. The method of claim 32 wherein said fill port is closed with a sealing element, and wherein said step of connecting said sealed tubing system includes:

opening said fill port by displacing said sealing element; and connecting a tube element end to said fill port.

35. The method of claim 34 wherein said step of opening said fill port comprises the step of displacing said sealing element into said primary reservoir.

36. The method of claim 35 wherein said sealing element is a spherical ball member, and said displacing step includes pushing the ball member from said fill port into the primary reservoir.

37. The method of claim 33 wherein said tubing system includes a sealable port, and said step of connecting said tubing system includes the step of evacuating air bubbles from said closed path through said sealable port.

38. A method of replenishing liquid ink in a closed primary reservoir in an ink-jet printing system, comprising the following steps:

providing an ink-jet cartridge including an ink-jet print head and a closed primary reservoir in fluid communication with said print head for holding a first supply of liquid ink under negative pressure, said cartridge including a fill port extending through a cartridge frame and in communication with the primary reservoir, the frame comprising an external frame structural member fabricated from a first rigid plastic material and an inner frame member fabricated from a second plastic material, said second material softer than said first material, and wherein the fill port is lined with said second plastic material;

providing a closed auxiliary reservoir for holding a second supply of liquid ink, said auxiliary reservoir comprising a sealed collapsible bag;

providing a closed ink path running between the fill port of the cartridge and the auxiliary reservoir, said closed ink path being uninterruptible during normal printing operation;

passing ink through said print head, said auxiliary ink reservoir and closed ink path providing passive ink replenishment from said auxiliary reservoir to said primary reservoir during normal printer operation as ink is depleted from said primary reservoir as ink is passed through said print head, said depletion tending to increase said negative pressure within said closed primary reservoir and thereby draw ink from said auxiliary reservoir.

39. The method of claim 38 wherein said cartridge print head faces a first direction, and said fill port is formed in said cartridge frame to also face in said first direction.

40. The method of claim 38 wherein said step of providing a closed ink path comprises connecting a sealed tubing system between said fill port and said auxiliary reservoir.

41. The method of claim 38 wherein said primary reservoir includes at least one movable side wall and an internal spring for biasing said at least one movable side wall against collapsing as ink is withdrawn from said reservoir and ejected from said print head during printing operations.

42. An ink-jet printing system, comprising:

an ink-jet cartridge including an ink-jet print head and a closed primary reservoir in fluid communication with said print head for holding a first supply of liquid ink under negative pressure, said cartridge including a fill port extending through a cartridge frame and in communication with the primary reservoir, the frame comprising an external frame structural member fabricated from a first rigid plastic material and an inner frame member fabricated from a second plastic material, said second material softer than said first material, and wherein the fill port is lined with said second plastic material;

a closed auxiliary reservoir for holding a second supply of liquid ink, said auxiliary reservoir comprising a sealed collapsible bag;

a closed ink path running between the fill port of the cartridge and the auxiliary reservoir which is uninterruptible during normal printing operation to provide passive ink replenishment from said auxiliary reservoir to said primary reservoir during normal printer operation as ink is depleted from said primary reservoir, said depletion tending to increase said negative pressure within said closed primary reservoir and thereby draw ink from said auxiliary reservoir.

43. The system of claim 42 wherein said cartridge print head faces a first direction, and said fill port is formed in said cartridge frame to also face in said first direction.

44. The system of claim 42 wherein said closed ink path comprises a sealed tubing system connected between said fill port and said auxiliary reservoir.

* * * * *